US009026892B2

(12) United States Patent
Inada et al.

(10) Patent No.: US 9,026,892 B2
(45) Date of Patent: May 5, 2015

(54) MEMORY MANAGEMENT METHOD, STORAGE DEVICE, AND COMPUTER WITH THE SAME

(71) Applicant: Hitachi, Ltd., Tokyo (JP)

(72) Inventors: Ryoichi Inada, Atsugi (JP); Ryo Fujita, Hitachi (JP); Yuzuru Takahashi, Naka-gun (JP)

(73) Assignee: Hitachi, Ltd., Tokyo (JP)

( * ) Notice: Subject to any disclaimer, the term of this patent is extended or adjusted under 35 U.S.C. 154(b) by 241 days.

(21) Appl. No.: 13/859,131

(22) Filed: Apr. 9, 2013

(65) Prior Publication Data
US 2013/0275836 A1    Oct. 17, 2013

(30) Foreign Application Priority Data

Apr. 13, 2012    (JP) .................................. 2012-091671

(51) Int. Cl.
*G11C 29/00*    (2006.01)
*G06F 11/10*    (2006.01)
*G06F 12/02*    (2006.01)

(52) U.S. Cl.
CPC ........ *G06F 11/1068* (2013.01); *G06F 12/0246* (2013.01); *G06F 2212/7211* (2013.01)

(58) Field of Classification Search
CPC ............ G06F 11/1068; G06F 11/1072; G06F 11/1008; G06F 11/1076; G11C 29/00
USPC ....................................................... 714/773
See application file for complete search history.

(56) References Cited

U.S. PATENT DOCUMENTS

| 2006/0087893 | A1* | 4/2006 | Nishihara et al. ......... 365/189.01 |
| 2008/0046778 | A1* | 2/2008 | Yoshida ............................. 714/5 |
| 2011/0302477 | A1* | 12/2011 | Goss et al. .................... 714/773 |
| 2012/0246399 | A1 | 9/2012 | Nishi et al. |
| 2013/0007566 | A1* | 1/2013 | Shalvi et al. .................. 714/773 |

FOREIGN PATENT DOCUMENTS

| JP | 2010-086404 A | 4/2010 |
| JP | 2012-174086 A | 9/2012 |

OTHER PUBLICATIONS

Inada et al, "Storage Device and Computer Using the Same", U.S. Appl. No. 13/661,226, filed Oct. 26, 2012.

* cited by examiner

*Primary Examiner* — Albert Decady
*Assistant Examiner* — Enam Ahmed
(74) *Attorney, Agent, or Firm* — Volpe and Koenig, P.C.

(57) ABSTRACT

A storage device includes a nonvolatile memory, a volatile memory, and a memory controller. The volatile memory includes a free block management table, and a worn block management table. If the number of free blocks is equal to or larger than a threshold value 1, and errors of the number of equal to or larger than a threshold value 2 but smaller than a threshold value 3 are included in the data read from the nonvolatile memory, the memory controller registers the block in the worn block management table as a worn block. If the number of free blocks becomes smaller than the threshold value 1, the memory controller registers the worn block registered in the worn block management table in the free block management table as the free block.

18 Claims, 29 Drawing Sheets

FIG. 14

| WORN BLOCK ENTRY NO. 53a | VALID FLAG 53b | PHYSICAL BLOCK NO. 53c | THE NUMBER OF GENERATED ERRORS 53d |
|---|---|---|---|
| 0 | 1 or 0 | BLOCK Ws | E3 |
| ... | ... | ... | ... |
| W-1 | 1 or 0 | BLOCK Wt | E4 |

53B WORN BLOCK MANAGEMENT TABLE

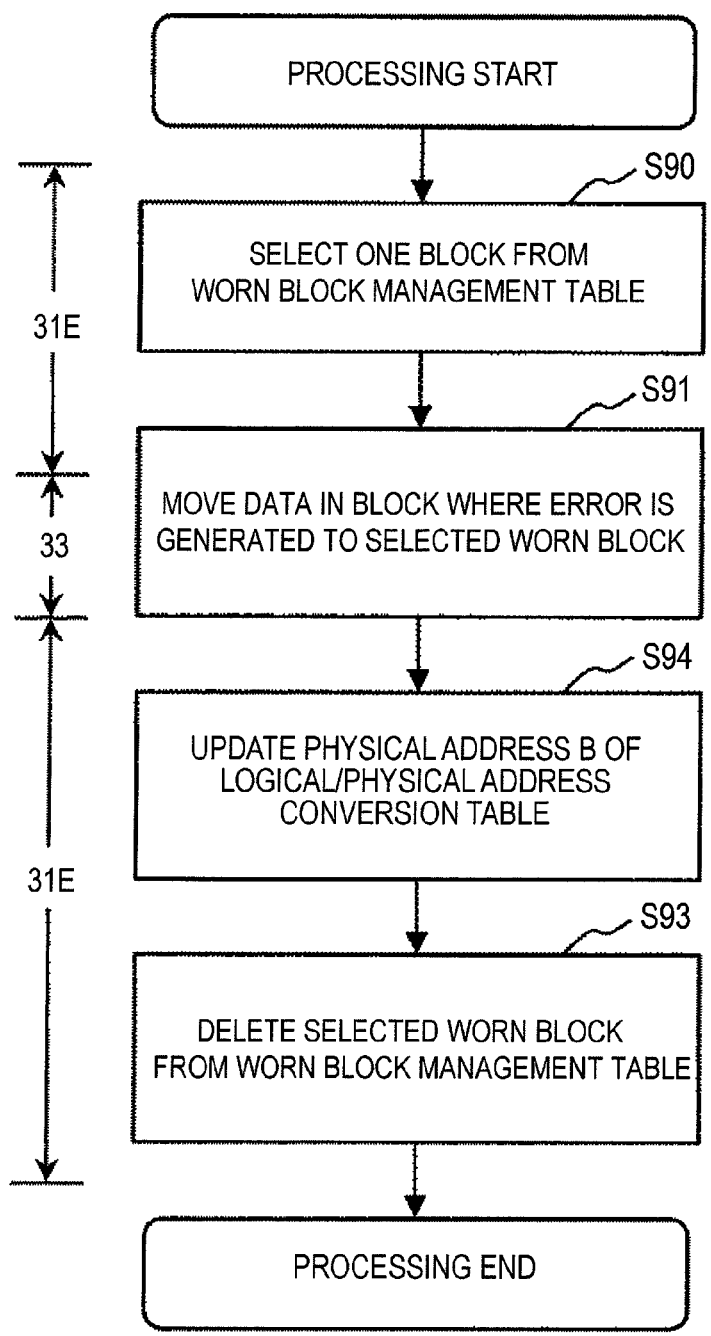

MEMORY MANAGEMENT METHOD, STORAGE DEVICE, AND COMPUTER WITH THE SAME

BACKGROUND OF THE INVENTION

1. Field of the Invention

The present invention relates to a memory management method, a storage device, and a computer equipped with the storage device.

2. Description of Related Art

As auxiliary storage devices of information equipment, in general, magnetic disc storage devices have extensively been used. However, in recent years, the magnetic disc storage devices are increasingly replaced with storage devices having a semiconductor memory as a storage medium. Among the storage devices, a storage device using a flash memory which is a sort of electrically erasable programmable read only memories (EEPROM) becomes mainstream.

The flash memory is excellent in read and write speeds as compared with a magnetic disc. On the other hand, the flash memory suffers from such a problem that when the number of writes and the number of reads are increased, data internally saved is changed, and an error is generated.

For that reason, in the storage device using the flash memory, an error correction circuit is frequently disposed within a controller so as to allow errors up to a given number. Also, in order to ensure the reliability, a spare area is provided in addition to a data retention area, and if a given number or more of errors is generated, the data retention area is discarded, and the spare area is used instead. However, when this method is used, if the errors are frequently generated, the spare area is rapidly lost, and an operating time of the storage device may be shortened.

The background art of the storage device using the flash memory is disclosed in JP-A-2010-86404. In order to prevent the spare area from being rapidly, reduced by the error, there is a disclosure in JP-A-2010-86404 that "An error correction circuit and a block management means are provided in a flash memory device, and after the remaining number of spare blocks reaches a threshold value set in the block management means, data having a bit error is error-corrected, and transmitted to a host, and a block in which the errors are generated is refreshed. The refreshment is executed by transcribing all data including the error-corrected data in that block into a free block or a spare block, and erasing the data in the original block. Alternatively, the refreshment is executed by writing back the data on the original block after transcribing all data into the free block or the spare block."

In JP-A-2010-86404, if the number of spare blocks becomes smaller than a given number, a block in which the number of errors is smaller than a threshold value 2 (6 bits) is refreshed, and replaced with the free block or the spare block. However, in this method, if the number of spare blocks is equal to or larger than the given number, the block is not refreshed, and a block in which the number of errors is equal to or larger than the threshold value 1 (4 bits) but smaller than the threshold value 2 is discarded as a fault block. For that reason, the number of refreshable blocks is small, and the effect of prolonging the operating time is small.

SUMMARY OF THE INVENTION

In order to obtain the effect of prolonging the operating time, there is a need to review the treatment of an area which is discarded as the fault block. More specifically, there is a need to review the treatment of a case in which the number of spare blocks is equal to or larger than a given value, and the number of errors is equal to or larger than the threshold value 1 (4 bits) but smaller than the threshold value 2.

Under the circumstances, the present invention aims at providing a memory management method and a storage device in which the operating time can be more prolonged, and a computer equipped with the storage device.

In order to solve the above problem, for example, a configuration defined in the claims is applied.

The present invention includes a plurality of solutions to the above problem, and according to one aspect of the present invention, there is provided a storage device including a nonvolatile memory having a page which is a given write unit, and a block which is an erasure unit larger than the write unit; a RAM which allows data to be read and written therefrom or therein; and a memory controller that conducts read and write processing on the nonvolatile memory, in which the RAM includes a free block management table that manages the free block, and a worn block management table that manages the worn block, and in which when the number of free blocks registered in the free block management table is equal to or larger than a threshold value 1, and errors of the number equal to or larger than a threshold value 2 and smaller than a threshold value 3 are included in data read from the nonvolatile memory, the memory controller registers the data block that holds the data in the worn block management table as the worn block, and in which when the number of free blocks registered in the free block management table is smaller than the threshold value 1, the memory controller registers the worn block registered in the worn block management table in the free block management table as the free block.

According to the present invention, even if the number of free blocks is equal to or larger than the given number, the worn block is ensured, and when the number of free blocks is smaller than the given number, the ensured worn block is replenished as the free block so that an operating time of the storage device can be more prolonged.

The other problems, configurations, and effects will become from the description of the following embodiments.

BRIEF DESCRIPTION OF THE DRAWINGS

FIG. 14 is a diagram illustrating the contents of a worn block management table according to a third embodiment;

FIG. 32 is a flowchart of data movement processing to a worn block B according to the sixth embodiment.

DESCRIPTION OF PREFERRED EMBODIMENTS

Hereinafter, embodiments will be described with reference to the accompanying drawings.

First Embodiment

A first embodiment exemplifies a storage device that can further prolong an operating time.

Figure 1:
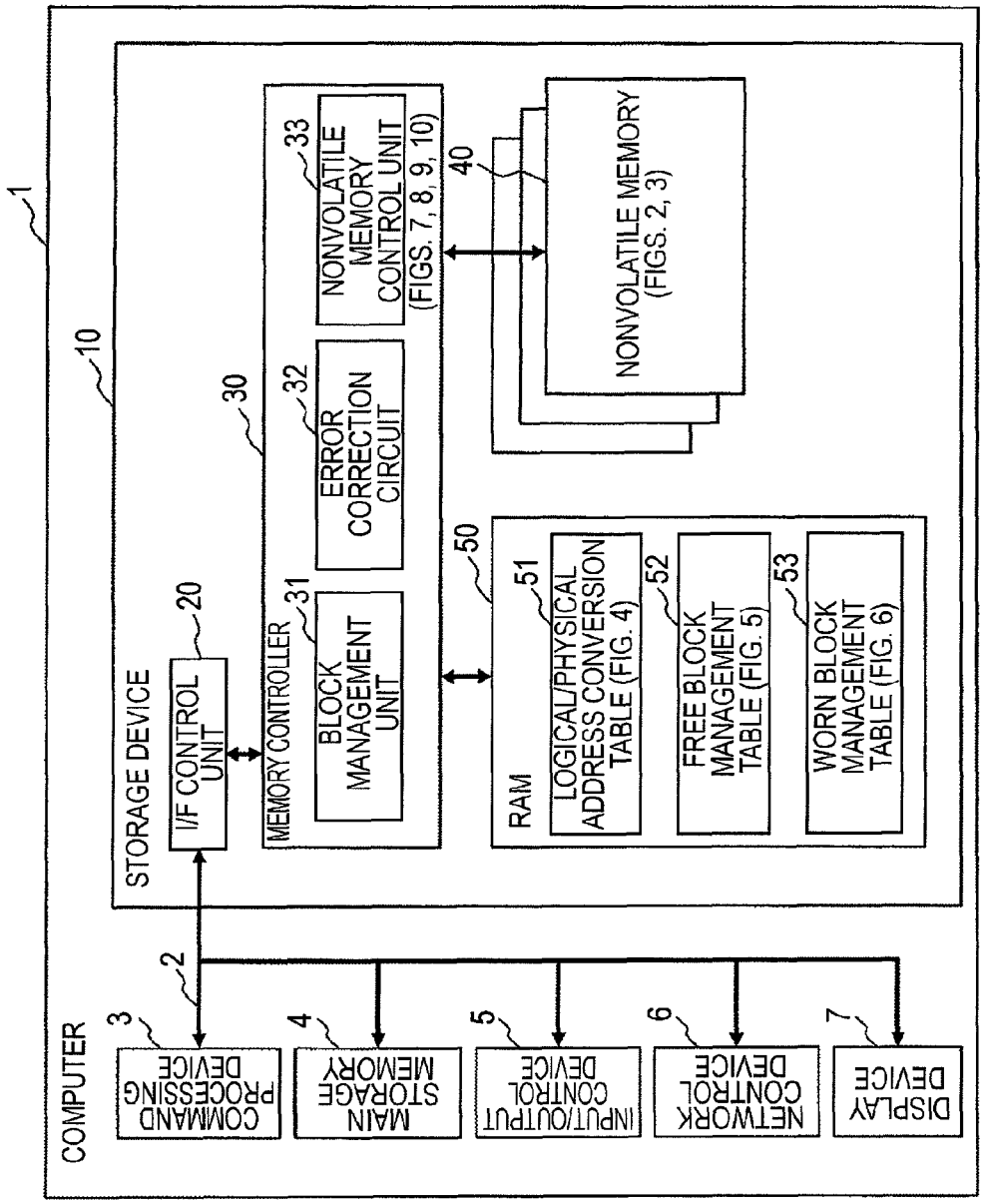
FIG. 1 is a diagram illustrating a hardware configuration according to a first embodiment of the present invention.

FIG. 1 is an example of a hardware configuration diagram according to a first embodiment.

A computer 1 includes a storage device 10, a command processing device 3, a main storage memory 4, an input/output control device 5, a network control device 6, a display device 7, and a data bus 2. The storage device 10, the command processing device 3, the main storage memory 4, the input/output control device 5, the network control device 6, and the display device 7 are connected to each other through the data bus 2.

Among those devices, the command processing device 3 processes data on the basis of a command stored in the storage device 10 or the main storage memory 4, and controls the input/output control device 5, the network control device 6, and the display device 7.

The storage device 10 and the main storage memory 4 write data, and read written data according to the processing from the command processing device 3.

The input/output control device 5 is configured to be controlled by the command processing device 3 through the data bus 2 to input/output data to/from an external device (not shown). The external device that inputs and outputs the data through the input/output control device 5 includes, for example, a keyboard, a mouse, the externally attached storage device 10, and so on.

The network control device 6 is configured to be controlled by the command processing device 3 through the data bus 2 to input/output data to/from a network (not shown).

The display device 7 is configured to display data under a control of the command processing device 3.

The storage device 10 includes an I/F (interface) control unit 20, a memory controller 30, a RAM 50, and one or more nonvolatile memories 40.

The I/F control unit 20 controls the input/output of data between the command processing device 3 and the memory controller 30.

The memory controller 30 is configured to control the RAM 50 and the nonvolatile memories 40. The memory controller 30 includes a block management unit 31, an error correction circuit 32, and a nonvolatile memory control unit 33.

The block management unit 31 controls input/output of data with respect to the nonvolatile memories 40 according to a command from the command processing device 3. Also, the block management unit 31 manages a data block 60, a free block 61, and a worn block 62, which will be described later with reference to FIG. 3, and updates a logical/physical address conversion table 51, a free block management table 52, and a worn block management table 53 within the RAM 50.

The error correction circuit 32 determines whether an error is included in data read from the nonvolatile memories 40, or not, and implements an error correction if the error is included in the data. Also, the error correction circuit 32 notifies the block management unit 31 of the number of errors.

The nonvolatile memory control unit 33 writes and reads the data with respect to the nonvolatile memories 40 according to an instruction from the block management unit 31.

Each of the nonvolatile memories 40 stores the data instructed to be written by the nonvolatile memory control unit 33 therein. In this example, the nonvolatile memory 40 has a given write unit and an erasure unit larger than the write unit, and requires erasing operation before writing if rewriting the data. A configuration of the nonvolatile memory 40 will be described in detail with reference to FIG. 2 to be described later.

The RAM 50 stores the logical/physical address conversion table 51, the free block management table 52, and the worn block management table 53 therein. The logical/physical address conversion table 51 is configured to indicate a storage place of the data stored within the nonvolatile memory 40, and will be described in detail with reference to FIG. 4 to be described later. The free block management table 52 is configured to manage free block information, and will be described in detail later with reference to FIG. 5 to be described later. The worn block management table 53 is configured to manage the worn block information, and will be described in detail later with reference to FIG. 6 to be described later.

The RAM 50 may be configured by a volatile memory such as an SRAM (static RAM) or a DRAM (dynamic RAM), or a nonvolatile memory such as an MRAM (magnetic RAM), a ReRAM (resistance RAM), or a PRAM (phase change RAM). When the nonvolatile memory is used, the nonvolatile memory that does not need the erasing operation in rewriting data is required. Also, the RAM 50 may be disposed within the memory controller 30.

Figure 2:
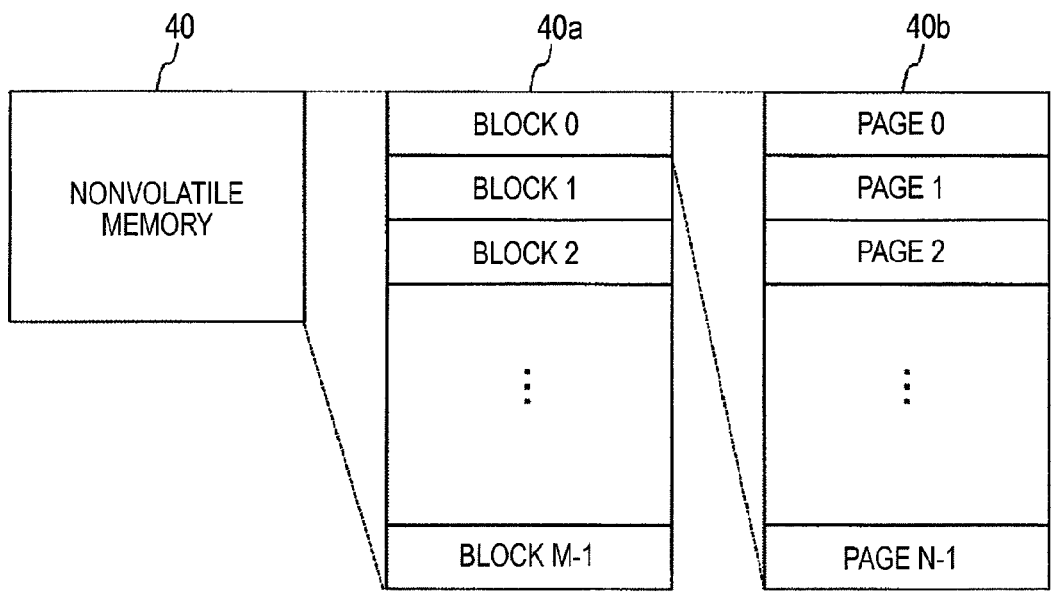
FIG. 2 is a diagram illustrating an internal configuration of a nonvolatile memory.

FIG. 2 is a diagram illustrating a configuration of the nonvolatile memory 40. The nonvolatile memory 40 is configured by one or more erasure units, and each erasure unit is called "block 40a". Also, the block 40a is configured by one or more write units, and each write unit is called "page 40b". In this embodiment, it is assumed that the number of blocks in the nonvolatile memory 40 is M blocks, and the number of pages per one block is N pages.

Figure 3:
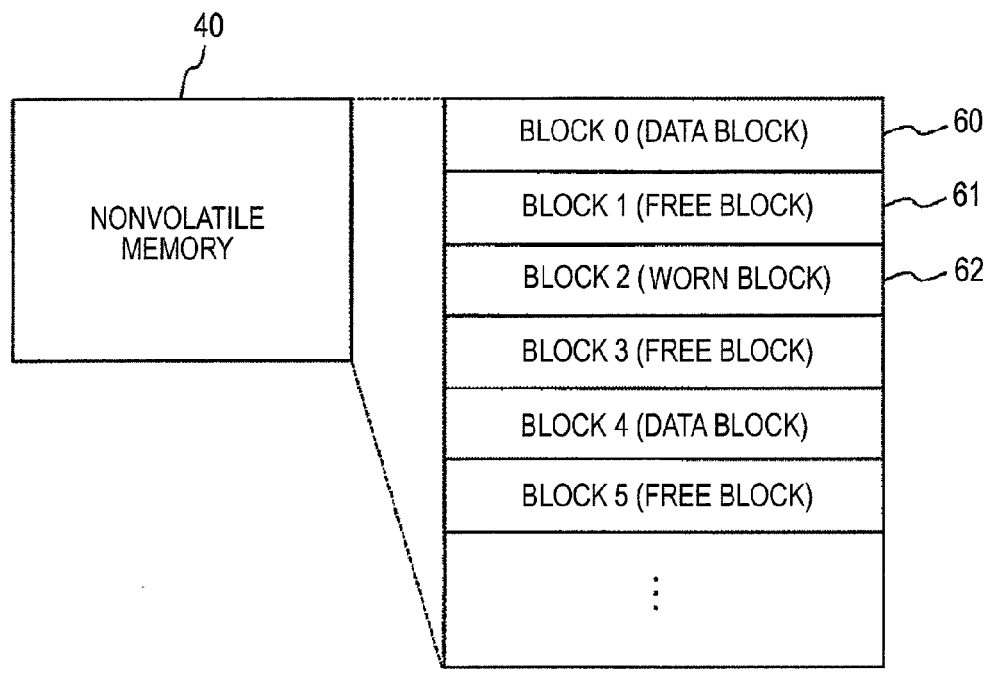
FIG. 3 is a diagram illustrating a use state of blocks in the nonvolatile memory.

FIG. 3 is a diagram illustrating a use state of the respective blocks 40a in the nonvolatile memory 40. In this embodiment, the block 40a is divided into three tasks of the data block 60, the free block 61, and the worn block 62 in use. The data block 60 is configured to retain data for which a write command is received from the command processing device 3. The free block 61 is configured not to retain data in any pages 40b.

The worn block 62 is a block in which data is not retained in any pages 40b as with the free block 61. A difference between the free block 61 and the worn block 62 is whether the error is generated, or not, which will be described in detail in a block replacement processing flowchart of FIG. 9.

Figure 4:
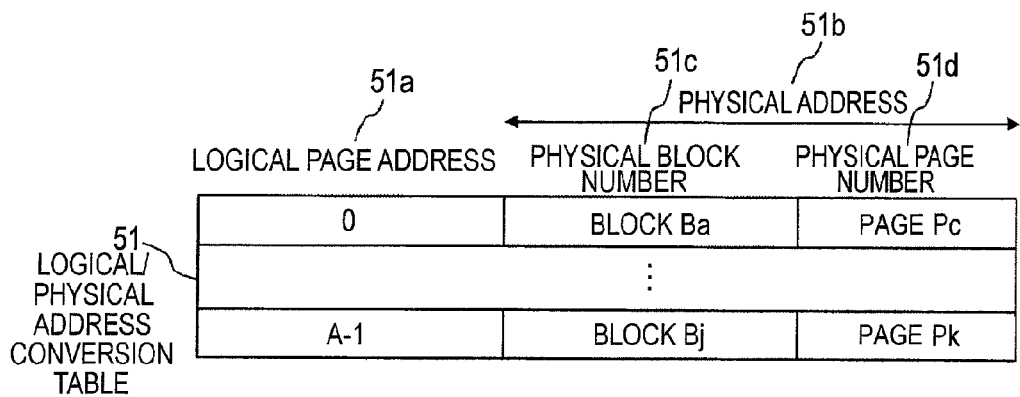
FIG. 4 is a diagram illustrating the contents of logical/physical address conversion table according to the first embodiment.

FIG. 4 is a configuration diagram of the logical/physical address conversion table 51 according to the first embodiment. The logical/physical address conversion table 51 is configured to manage a physical address 51b corresponding to a logical page address 51a. The logical/physical address conversion table 51 includes the logical page address 51a and the physical address 51b, and the physical address 51b is represented by the combination of a physical block No. 51c with a physical page No. 51d. In the logical page address 51a, the logical addresses designated by the command processing device 3 are organized for each page 40b.

Figure 5:
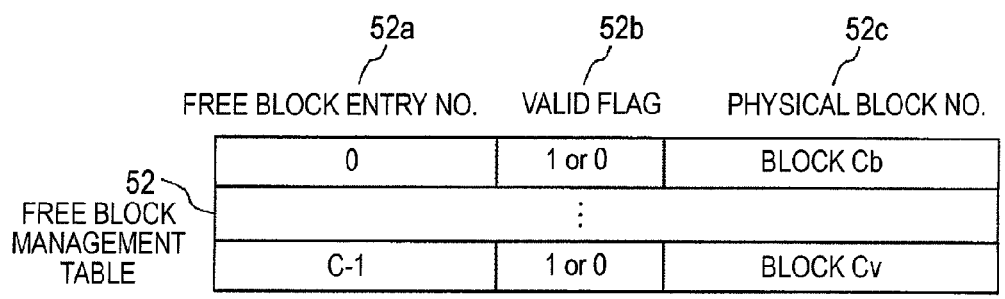
FIG. 5 is a diagram illustrating the contents of a free block management table according to the first embodiment.

FIG. 5 is a configuration diagram of the free block management table 52 according to the first embodiment. The free block management table 52 is configured to store management information of the free block 61 therein, and includes a free block entry No. 52a, a valid flag 52b, and a physical block No. 52c.

The free block entry No. 52a is a registration No. of the free block 61, and in this embodiment, C free blocks 61 can be registered at a maximum.

The valid flag 52b is information indicative of whether a block of the physical block No. 52c registered in the target free block entry No. 52a can be used as the free block 61, or not. In the valid flag 52b is stored "1" if the appropriate block can be used as the free block 61, and "0" if not.

Figure 6:
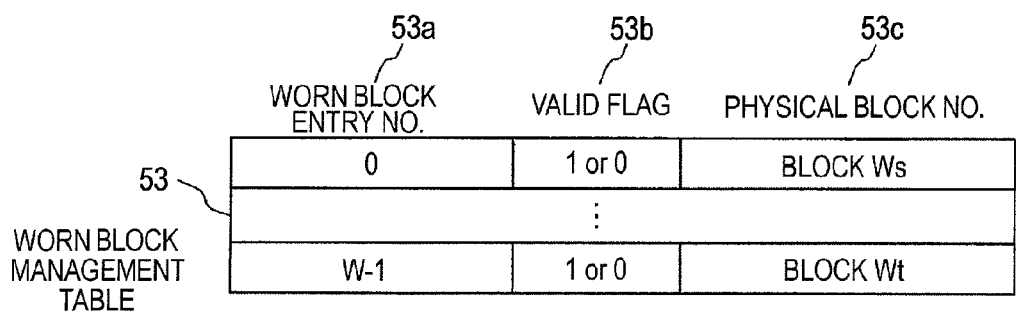
FIG. 6 is a diagram illustrating the contents of a worn block management table according to the first embodiment.

FIG. 6 is a configuration diagram of the worn block management table 53 according to the first embodiment. The worn block management table 53 is configured to store management information of the worn block 62, and includes a worn block entry No. 53a, a valid flag 53b, and a physical block No. 53c.

The worn block entry No. 53a is a registration No. of the worn block 62, and in this embodiment, W worn blocks 62 can be registered at a maximum.

The valid flag 53b is information indicative of whether a block of the physical block No. 53c registered in the target worn block entry No. 53a can be used as the worn block 62, or not. In the valid flag 53b is stored "1" if the appropriate block can be used as the worn block 62, and "0" if not.

Figure 7:
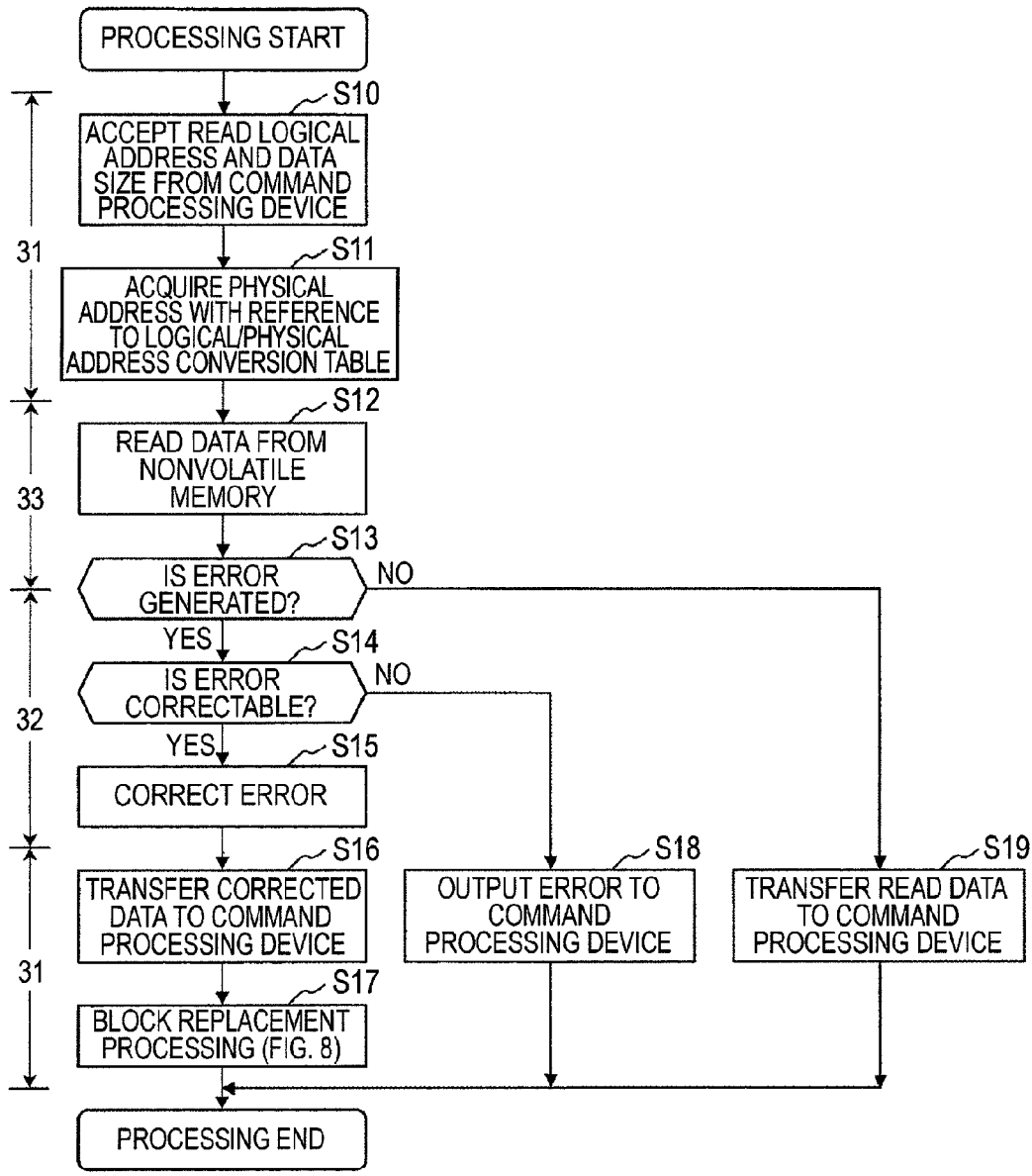
FIG. 7 is a flowchart of data read processing according to the first embodiment.

FIG. 7 is a flowchart of data read processing according to the first embodiment. In processing appearing in the flowchart, the same step Nos. represent identical processing. For that reason, the processing already described before is not again described, but will be omitted from description.

Referring to FIG. 1, when the storage device 10 receives a data read request from the main storage memory 4, the storage device 10 starts data read processing.

The processing in the flowchart described below including FIG. 7 is basically executed in the memory controller 30 within the storage device 10. More specifically, which function (block management unit 31, error correction circuit 32, nonvolatile memory control unit 33) of the memory controller 30 is executed is indicated on a left side of the respective flowchart blocks by reference numerals of those functions.

First, in Step S10, the block management unit 31 within the memory controller 30 receives the logical address and a data size of a read target from the command processing device 3 through the I/F control unit 20.

Then, in Step S11, the block management unit 31 converts the received logical address into the logical page address 51a. Thereafter, the block management unit 31 reads the physical address 51b corresponding to the logical page address 51a with the use of the logical/physical address conversion table 51 in FIG. 4.

In Step S12, the block management unit 31 instructs the nonvolatile memory control unit 33 to read data from the physical address 51b read in Step S11. The nonvolatile memory control unit 33 reads the data from the nonvolatile memory 40 in FIG. 1 according to an instruction from the block management unit 31.

In Step S13, the nonvolatile memory control unit 33 transfers the data read from the nonvolatile memory 40 in Step S12 to the error correction circuit 32. The error correction circuit 32 determines whether an error is included in the data received from the nonvolatile memory control unit 33, or not.

In this situation, if the error is included in the data, the flow proceeds to processing of Step S14. If no error is included in the data, after the data has been transferred to the block management unit 31, the flow proceeds to processing of Step S19.

In Step S14, the error correction circuit 32 determines whether the error included in the data is correctable, or not. If correctable, the flow proceeds to processing of Step S15, but if not correctable, the flow proceeds to processing of Step S18.

In Step S15, the error correction circuit 32 corrects the error within the data. In this situation, the error correction circuit 32 transfers the corrected data to the block management unit 31, and also notifies the block management unit 31 of the number of corrected errors.

In Step S16, the block management unit 31 transfers the corrected data to the command processing device 3 through the I/F control unit 20.

In Step S17, the block management unit 31 implements block replacement processing. The block replacement processing will be described in detail with reference to FIG. 8 to be described later.

In Step S18, the error correction circuit 32 notifies the block management unit 31 that the error correction is impossible. Upon receiving a notification from the error correction circuit 32, the block management unit 31 notifies the command processing device 3 of a data read error through the I/F control unit 20.

In Step S19, the block management unit 31 transfers the data received from the error correction circuit 32 to the command processing device 3 through the I/F control unit 20.

Upon completion of any processing in Steps S17, S18, and S19, the storage device 10 completes the data read processing of FIG. 7.

The treatment of the data sent to the data bus 2 by the storage device 10 through the processing of FIG. 7 is summarized as follows. First, if no error is present in the data extracted from the nonvolatile memory 40, the data is transferred as it is. if the error is present in the data and correctable, the corrected data is transferred, and also information on the number of corrected errors is given. If the error is present in the data and uncorrectable, the data read error is given.

Figure 8:
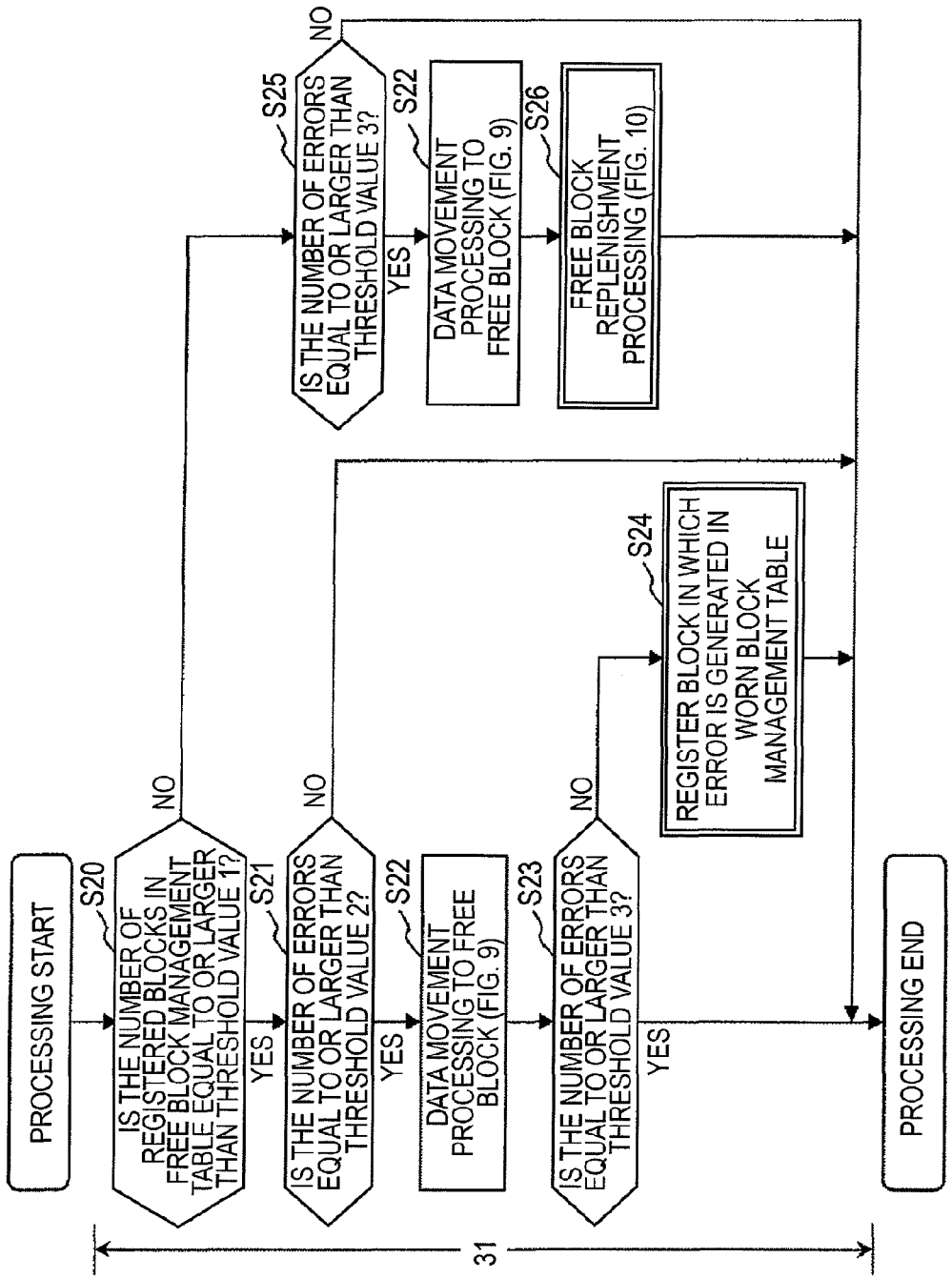
FIG. 8 is a flowchart of block replacement processing according to the first embodiment.

FIG. 8 is a flowchart of the block replacement processing according to the first embodiment.

In Step S20, the block management unit 31 determines whether the number of free blocks registered in the free block management table 52 is equal to or larger than a threshold value 1, or not. If the number of free blocks is equal to or larger than the threshold value 1, the flow proceeds to processing of Step S21 whereas if the number of free blocks is smaller than the threshold value 1, the flow proceeds to processing of Step S25.

As illustrated in FIG. 5, the number of free blocks 61 registered in the free block entry No. 52a of the free block management table 52 is C at a maximum. In this example, the number of available (data "1") free blocks among those free blocks is extracted with reference to information of the valid flag 52b, and then compared with the threshold value 1.

In Step S21, the block management unit 31 determines whether the number of errors notified from the error correction circuit 32 is equal to or larger than a threshold value 2, or not. If the number of errors is equal to or larger than the threshold value 2, the flow proceeds to processing of Step S22 whereas if the number of errors is smaller than the threshold value 2, the block management unit 31 terminates the block replacement processing.

In Step S22, the block management unit 31 and the nonvolatile memory control unit 33 implement data movement to the free block. The data movement to the free block will be described in detail with reference to FIG. 9 to be described later.

In Step S23 after the data movement to the free block, the block management unit 31 determines whether the number of errors notified from the error correction circuit 32 is equal to or larger than a threshold value 3, or not. If the number of errors is equal to or larger than the threshold value 3, the block replacement processing is terminated whereas the number of errors is smaller than the threshold value 3, the flow proceeds to processing of Step S24. The threshold value 3 is larger than the threshold value 2.

In Step S24, the block management unit 31 reads the worn block management table 53 (FIG. 6) from the RAM 50, and retrieves the worn block entry No. 53a in which the valid flag 53b is "0: unavailable as the worn flag". Then, the block management unit 31 registers a block No. in which the errors are generated in the physical block No. 53c of the appropriate worn block entry No. 53a, and changes the valid flag 53b to "1: available as the worn flag". After completion of the processing in Step S24, the block management unit 31 terminates the block replacement processing.

In Step S25, the block management unit 31 determines whether the number of errors notified from the error correction circuit 32 is equal to or larger than the threshold value 3, or not. If the number of errors is equal to or larger than the threshold value 3, the flow proceeds to processing (data movement processing to the free block) of Step S22 whereas the number of errors is smaller than the threshold value 3, the block management unit 31 terminates the block replacement processing.

In Step S26, the block management unit 31 implements free block replenishment processing. The free block replenishment processing will be described in detail with reference to FIG. 10 to be described later. After completion of the processing in Step S26, the block management unit 31 terminates the block replacement processing.

Through the above processing in FIG. 8, the following processing is conducted according to the number of errors. First, if the number of errors is smaller (lower than the threshold value 2), the data movement processing is not conducted. If the number of errors is larger (equal to or larger than the threshold value 3), the data movement processing to the free block is conducted, and the number of free blocks is reduced through this processing. As a result, the number of free blocks is replenished. If the number of errors is an intermediate value (equal to or larger than the threshold value 2, but smaller than the threshold value 3), the blocks in which the errors are generated are registered in the worn block management table 53, and thereafter managed as the worn blocks.

Figure 9:
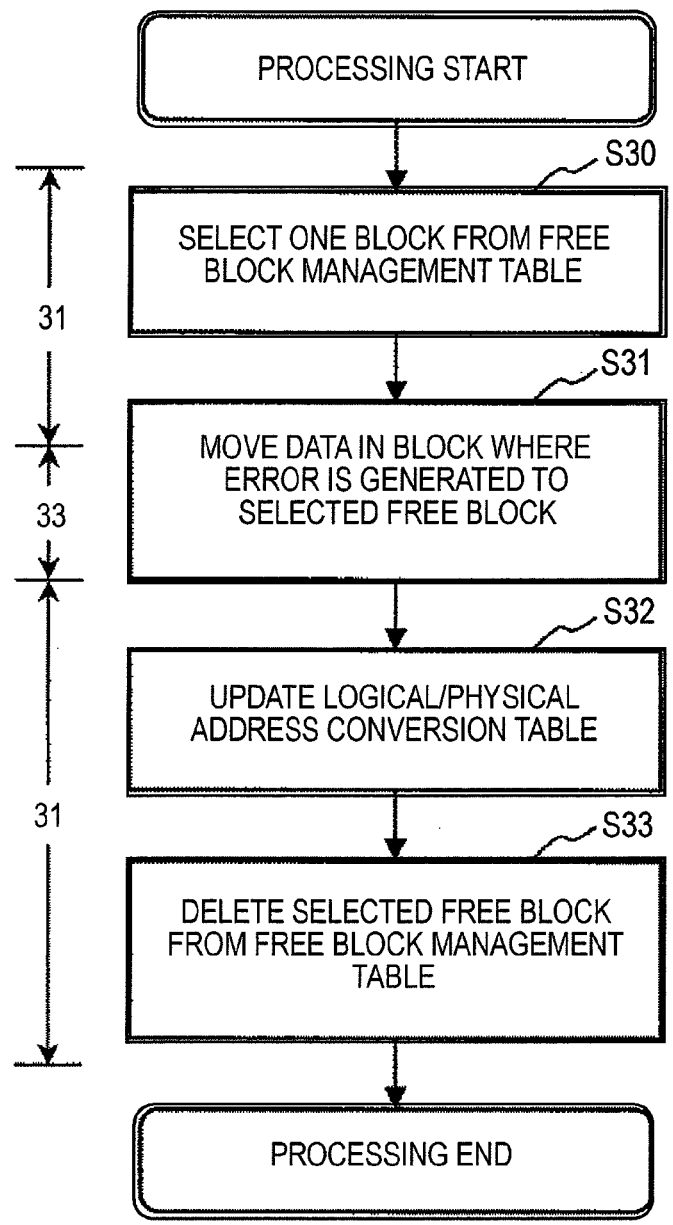
FIG. 9 is a flowchart of data movement processing to a free block according to the first embodiment.

FIG. 9 is a flowchart of the data movement processing (Step S22 in FIG. 8) to the free block according to the first embodiment.

In Step S30, the block management unit 31 reads the free block management table 52 (FIG. 5) from the RAM 50, selects one of the free block entry Nos. 52a in which the valid flag 52b is "1: available as the free block", and acquires the physical block No. 52c thereof. In this example, a system of selecting the free block entry No 52a is not particularly restricted, but the free block entry Nos. 52a may be selected in order from the entries whose registration is older, such as FIFO (first in first out).

In Step S31, the block management unit 31 instructs the nonvolatile memory control unit 33 to copy data retained by the data block 60 in which the errors are generated to the physical block No. 52c selected in Step S30. The nonvolatile memory control unit 33 implements data copy to the selected block according to an instruction from the block management unit 31. Also, after completion of the data copy, the block management unit 31 instructs the nonvolatile memory control unit 33 to erase the data in the data block 60 in which the errors are generated. The nonvolatile memory control unit 33 erases the data within the block according to the instruction from the block management unit 31.

In Step S32, the block management unit 31 updates the physical address 51b corresponding to the logical page address 51a of the copied data to the free block 61 which is a copy destination, in the logical/physical address conversion table 51 (FIG. 4).

In Step S33, the block management unit 31 changes the valid flag 52b of the free block entry No. 52a selected in Step S30 to "0: unavailable as the free block", in the free block management table 52 (FIG. 5).

Thus, with the data movement processing (Step S22 in FIG. 8) to the free block, the data retained by the data block 60 in which the errors are generated is copied to a new free block, and thereafter the copied free block is treated as the data block.

The data movement processing (Step S22 in FIG. 8) to the free block is implemented in combination with subsequent Step S24 (if the errors are equal to or larger than the threshold value 2, but smaller than the threshold value 3) whereby the original data block 60 in which the errors are generated are thereafter managed as the worn block 62.

Figure 10:
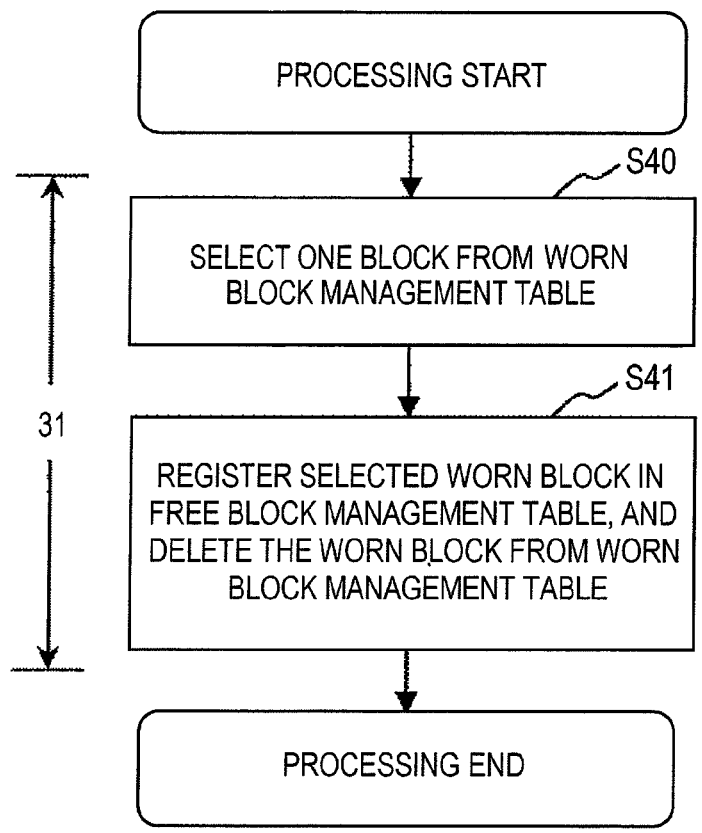
FIG. 10 is a flowchart of free block replenishment processing according to the first embodiment.

FIG. 10 is a flowchart of the free block replenishment processing according to the first embodiment.

In Step S40, the block management unit 31 reads the worn block management table 53 (FIG. 6) from the RAM 50, selects one of the worn block entry Nos. 53a in which the valid flag 53b is "1: available as the worn block", and acquires the physical block No. 53c thereof. In this example, a system of selecting the worn block entry No. 53a is not particularly restricted, but the worn block entry Nos. 53a may be selected in order from the entries whose registration is older, such as FIFO (first in first out).

In Step S41, the block management unit 31 reads the free block management table 52 (FIG. 5) from the RAM 50, and retrieves the free block entry No. 52a in which the valid flag 52b is "0: unavailable as the free block". Then, the block management unit 31 registers the physical block No. 53c acquired in Step S26 in the physical block No. 52c of the appropriate free block entry No. 52a, and changes the valid flag 52b to "1: available as the free block". Thereafter, the block management unit 31 changes the valid flag 53b of the worn block entry No. 53a selected in Step S26 to "0: unavailable as the worn block", in the worn block management table 53. After the completion of the processing in Step S41, the block management unit 31 terminates the free block replenishment processing.

With a series of processing in FIG. 10, thereafter, the selected block within the worn block is used as the free block. That is, the number of free blocks is replenished. If the errors are equal to or larger than the threshold value 3, the original data block 60 in which the errors are generated is virtually treated not to be used, as a fault block, because this block is not registered as the worn block 62 after the movement of the data has been completed in FIG. 9.

Figure 11:
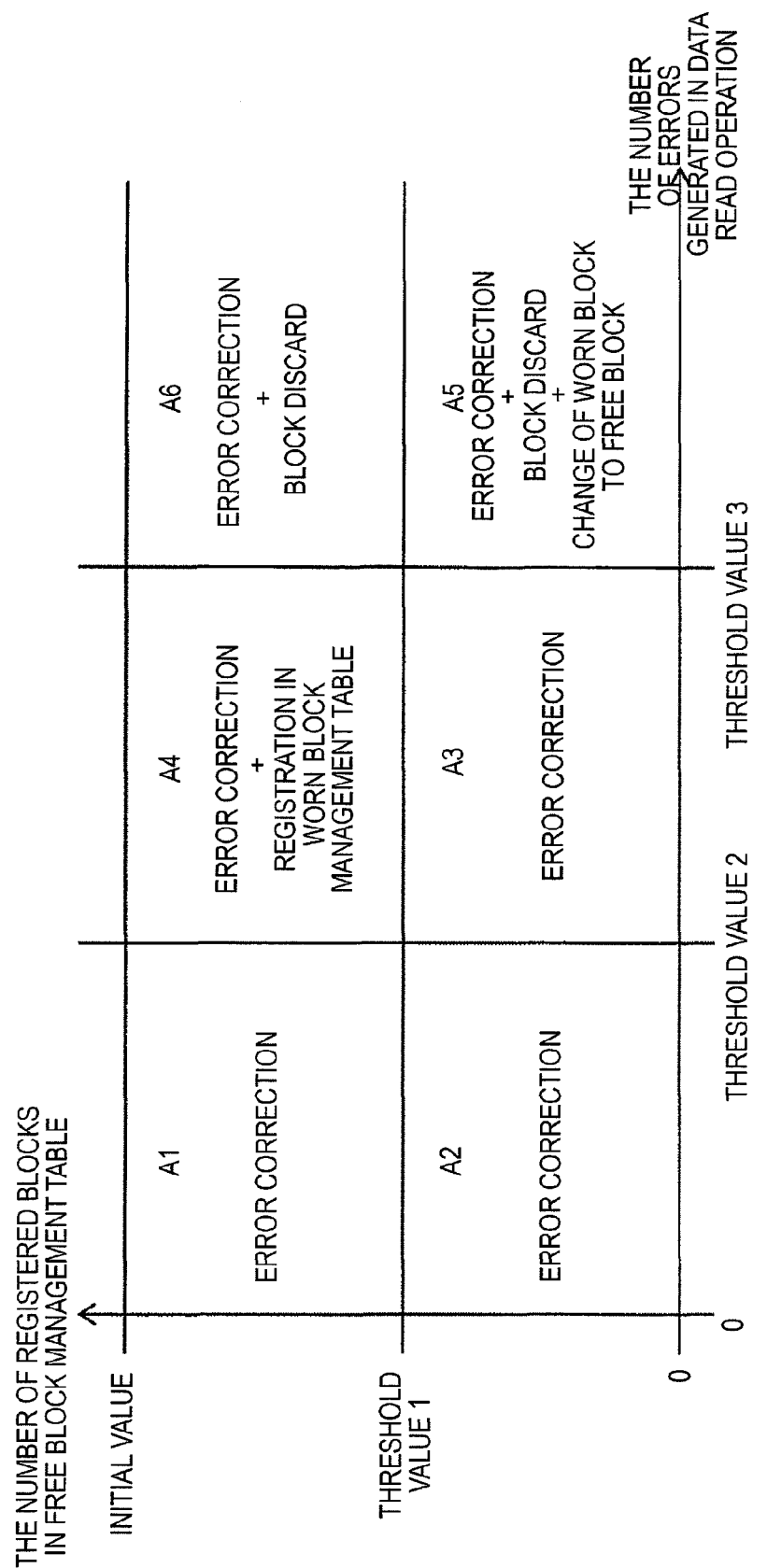
FIG. 11 is a diagram illustrating a block management method as a map according to the first embodiment.

FIG. 11 is a diagram illustrating a block management method as a map according to the first embodiment.

In the figure, the axis of ordinate represent the number of free blocks registered in the free block management table 52, and the axis of abscissa represents the number of generated errors in the data read operation. In this example, the processing is determined for each of six regions of A1 to A6 according to the conditions of the axes of ordinate and abscissa.

In a processing case of the first embodiment, if the number of generated errors in the data read operation is small (the number of errors is smaller than the threshold value 2), only error correction processing is conducted regardless of the number of free blocks registered in the free block management table as indicated in the areas A1 and A2.

Also, in the processing case of the first embodiment, if the number of generated errors in the data read operation is large (the number of errors is equal to or larger than the threshold value 3), block discard processing is conducted regardless of the number of free blocks registered in the free block management table as indicated in the areas A5 and A6.

Also, if the number of generated errors in the data read operation is intermediate (the number of errors is equal to or larger than the threshold value 2, but smaller than the threshold value 3), and the number of free blocks registered in the free block management table is smaller (the number of free blocks is smaller than the threshold value 1), only the error correction processing is conducted as indicated by the area A3.

On the contrary, in the present invention, the treatment of the area A4 is devised. That is, the feature of the present invention resides in that the treatment when the number of spare blocks (free blocks) is equal to or larger than a given number, and the number of errors is equal to or larger than the threshold value 2 but smaller than the threshold value 3, is reviewed.

If the number of free blocks is equal to or larger than the threshold value 1 (the axis of ordinate), and the number of errors in the data read operation is equal to or larger than the threshold value 2, but smaller than the threshold value 3 (the axis of ordinate), those conditions correspond to the area A4. In this situation, after the error correction has been implemented, the data in the block in which the errors are generated is copied to the free block 61. Then, the block in which the errors are generated is registered in the worn block management table 53, and the free block 61 which is the data copy destination is treated as the data block 60. A change from the free block 61 to the data block 60 is implemented by updating the logical/physical address conversion table 51.

If the number of free blocks is equal to or larger than the threshold value 1 (the axis of ordinate), and the number of errors in the data read operation is equal to or larger than the threshold value 3 (the axis of ordinate), those conditions correspond to the area A6. In this situation, after the error correction has been implemented, the data in the block in which the errors are generated is copied to the free block 61. Then, the block in which the errors are generated is discarded, and the free block 61 of the data copy destination is treated as the data block 60. The discard of the block is implemented by updating the logical/physical address conversion table 51, and erasing the block in which the errors are generated from the physical address 51b.

If the number of free blocks is smaller than the threshold value 1 (the axis of ordinate), and the number of errors in the data read operation is equal to or larger than the threshold value 3 (the axis of ordinate), those conditions correspond to the area A5. In this situation, after the error correction has been implemented, the data in the block in which the errors are generated is copied to the free block 61. Then, the block in which the errors are generated is discarded, and the free block 61 of the data copy destination is updated to the data block 60, and one of the worn blocks 62 is changed to the free block 61.

When the above-mentioned idea is organized, according to the first embodiment, in the memory management method in which a memory includes a plurality of blocks which is an erasure unit, and the plurality of blocks in the memory is divided into the plurality of data blocks, the plurality of free blocks, and the worn block in use, data check is conducted when reading data from the memory, the data block that retains that data is continuously used as the data block if the number of errors in the read data is smaller than the threshold value 2, the data block that retains the data is discarded if the number of errors in the read data is smaller than the threshold value 3, the data block that retains the data is treated as the worn block if the number of free blocks is equal to or larger than the threshold value 1, and the errors equal to or larger than the threshold value 2 and smaller than the threshold value 3 are included in the read data, and the worn block is used as the free block if the number of free blocks is lower than the threshold value 1, and the errors equal to or larger than the threshold value 3 are included in the read data.

The first embodiment described above has the following advantages.

The block management unit 31 registers the data block 60 in which the errors are generated, in the worn block management table 53 as the worn block 62 even when the number of free blocks registered in the free block management table 52 is equal to or larger than the threshold value 1. As a result, if the number of free blocks registered in the free block management table 52 is smaller than the threshold value 1, a large number of worn blocks 62 that can be replenished can be ensured, and the operating time of the storage device 10 can be further prolonged.

Also, in the following embodiments of the present invention, the use of the area A4 is devised.

Second Embodiment

This embodiment exemplifies a storage device that can further prolong the operating time, and also arbitrarily change the threshold values.

Figure 12:
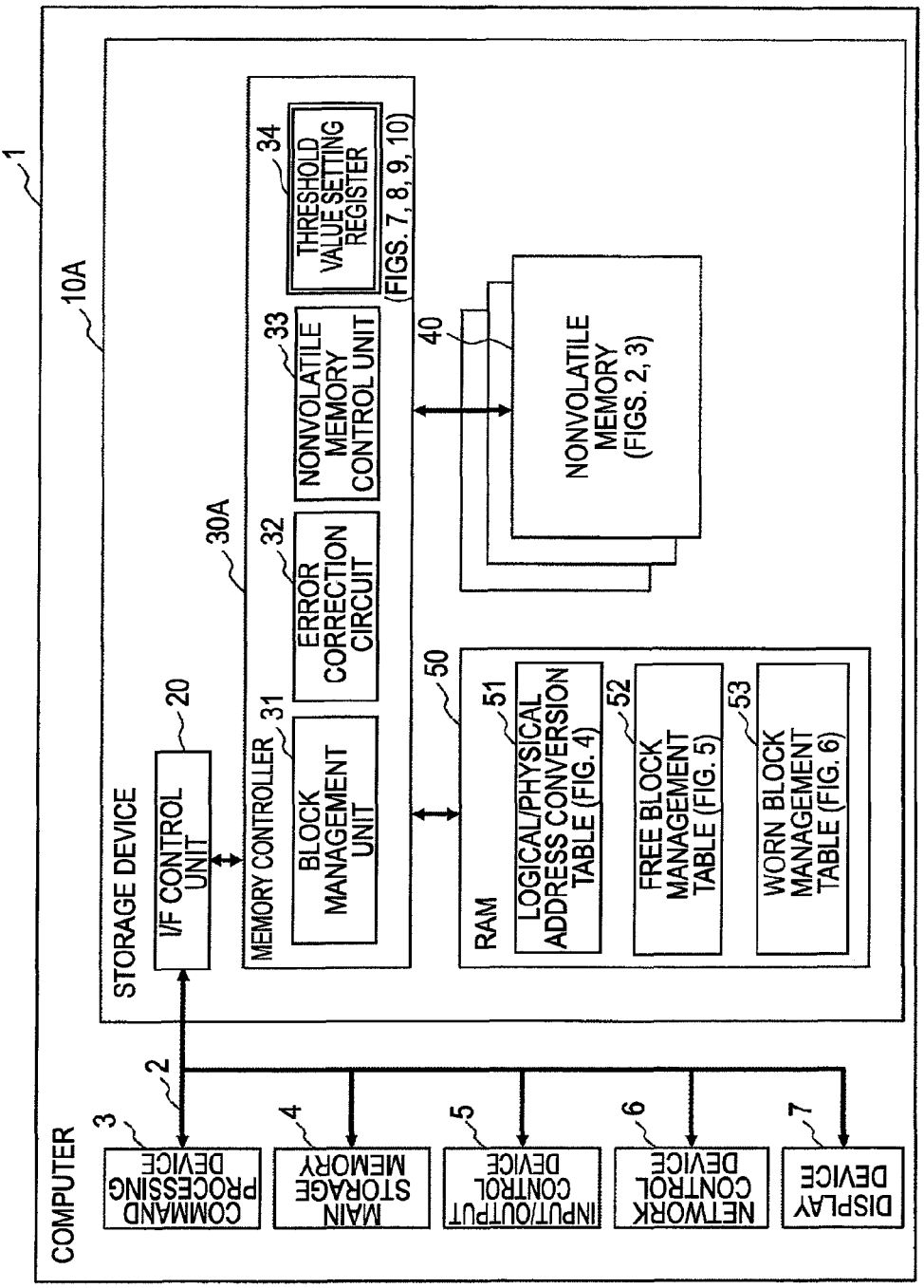
FIG. 12 is a diagram illustrating a hardware configuration according to a second embodiment.

FIG. 12 illustrates an example of a hardware configuration diagram according to a second embodiment. The same elements as those in the hardware configuration diagram of the first embodiment are denoted by identical reference numerals or symbols. Also, when changed or added portions are present as compared with the drawings of the first embodiment, main changed portions are clarified by double frame signs. The following drawings follow the rule of the double frame signs. In the case of FIG. 12, a threshold value setting register 34 added to the configuration of FIG. 1 is indicated by the double frame.

A storage device 10A in the second embodiment includes a memory controller 30A different from the memory controller 30 in the storage device 10 of the first embodiment. The other configurations are identical with those in the storage device 10 of the first embodiment.

The memory controller 30A in the second embodiment has the threshold value setting register 34 in addition to the memory controller 30 of the first embodiment. The threshold value setting register 34 is configured to arbitrarily change the threshold value 1, the threshold value 2, and the threshold value 3 used for the block management.

The values of the threshold value setting register 34 may be settable only in a manufacturing stage, or may be arbitrarily changeable from the external. As a method of changing the values from the external, for example, a change instruction may be given from the command processing device 3, or the values may be changed over by a switch mounted in the storage device 10.

Referring to FIG. 12, the threshold value setting register 34 is disposed within the memory controller 30A. However, without limited to this configuration, the threshold value setting register 34 may be disposed outside the memory controller 30A, or may be configured by a switch or a pin.

The operation of the storage device 10A in second embodiment is identical with that in the storage device 10 in the first embodiment. That is, the data read processing, the block replacement processing, the data movement processing to the free block, and the free block replenishment processing in the second embodiment are all identical with those in the first embodiment.

The second embodiment described above has the following advantages.

The memory controller 30A in the storage device 10A is equipped with the threshold value setting register 34, thereby being capable of arbitrarily changing the threshold value 1, the threshold value 2, and the threshold value 3 used for the block management.

Third Embodiment

This embodiment exemplifies a storage device that can further prolong the operating time, and also improve the reliability.

Figure 13:
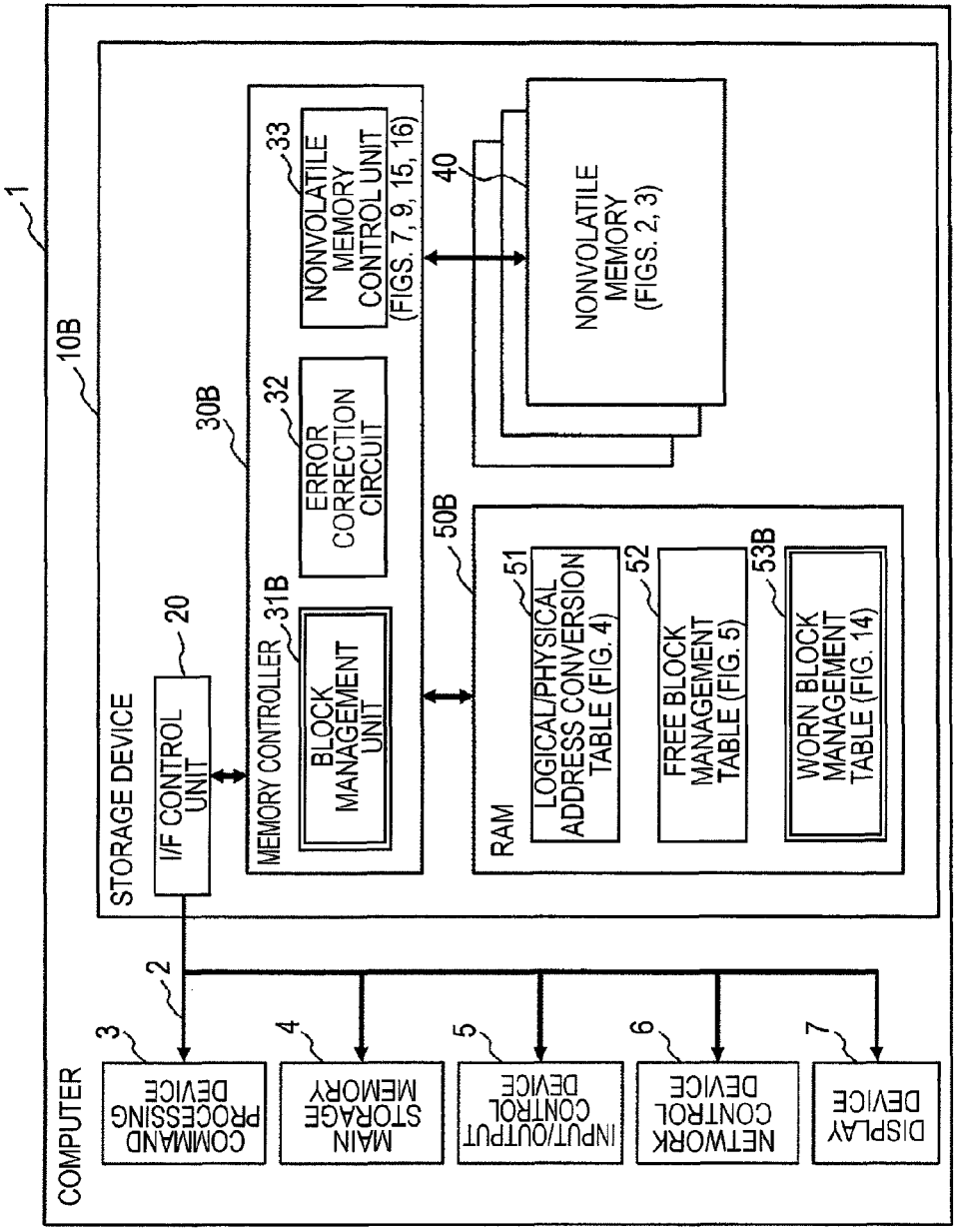
FIG. 13 is a diagram illustrating a hardware configuration according to a third embodiment.

FIG. 13 illustrates an example of a hardware configuration diagram according to a third embodiment. The same elements as those in the hardware configuration diagram of the first embodiment are denoted by identical reference numerals or symbols.

A storage device 10B in the third embodiment has a memory controller 30B different from the memory controller 30 of the storage device 10 in the first embodiment. Also, the storage device 10B of the third embodiment has a RAM 50B different from the RAM 50 of the storage device 10 in the first embodiment. The other configurations of the storage device 10B in the third embodiment are identical with those of the storage device 10 in the first embodiment.

The memory controller 30B in the third embodiment has a block management unit 31B different from the block management unit 31 in the memory controller 30 in the first embodiment. The other configurations of the memory controller 30B in the third embodiment are identical with those of the memory controller 30 in the first embodiment.

The RAM 50B in the third embodiment has a worn block management table 53B different from the worn block management table 53 in the RAM 50 of the first embodiment. The other configurations of the RAM 50B in the third embodiment are identical with those of the RAM 50 in the first embodiment.

FIG. 14 is a configuration diagram of the worn block management table 53B according to the third embodiment. The worn block management table 53B in the third embodiment has the number of generated errors 53d in addition to the worn block management table 53 of the first embodiment. The number of generated errors 53d stores the number of errors generated in the data read operation therein when registering the worn block 62 in the worn block management table 53B.

The data read operation of the storage device 10B in the third embodiment is identical with that of the storage device 10 in the first embodiment.

Figure 15:
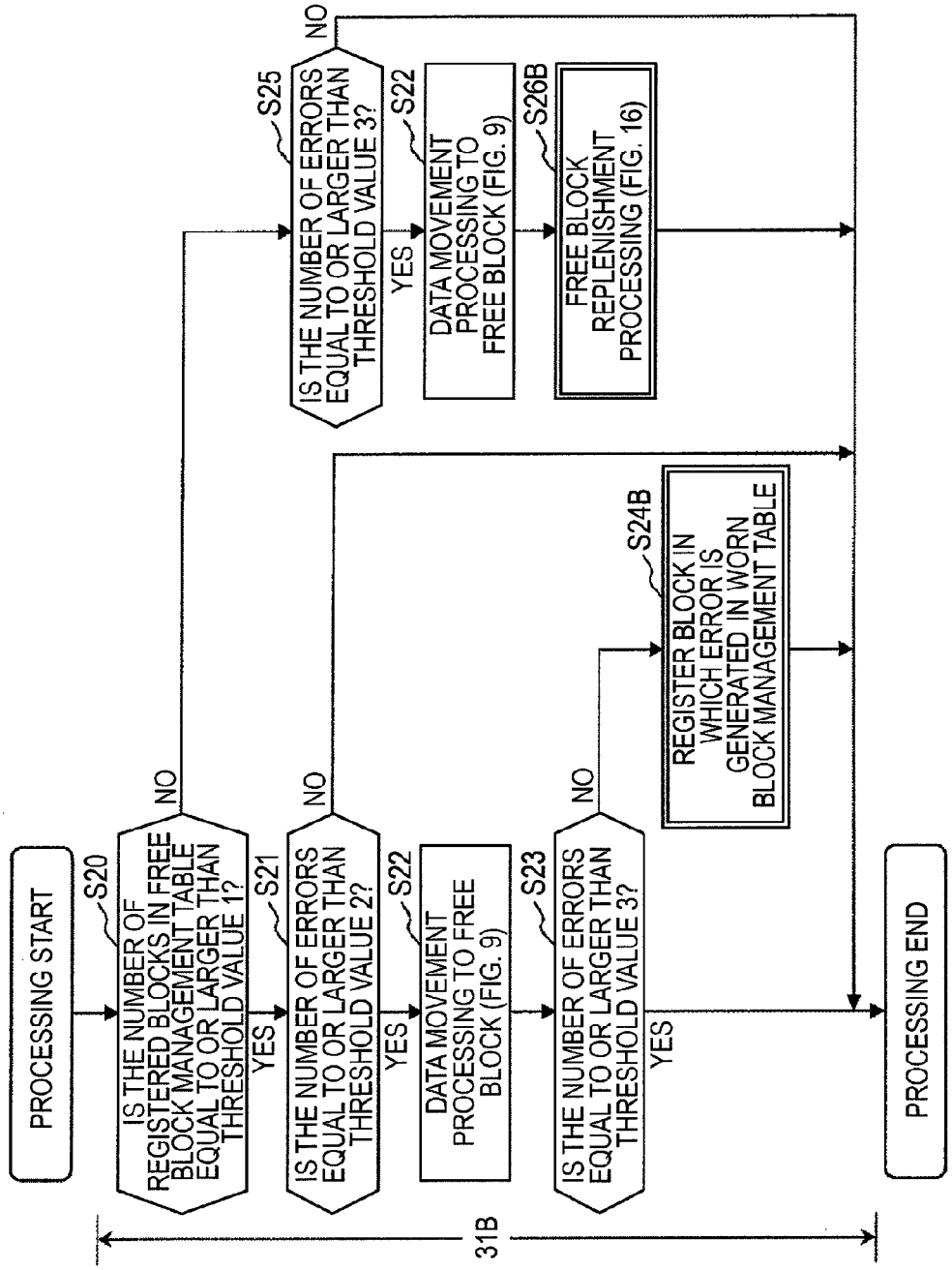
FIG. 15 is a flowchart of block replacement processing according to the third embodiment.

FIG. 15 is a flowchart of the block replacement processing according to the third embodiment. Accordingly, the flowchart of the block replacement processing in FIG. 8 according to the first embodiment is replaced with that in FIG. 15, and processed. The same elements as those in the first embodiment are denoted by identical reference numerals or symbols.

Processing in Steps S20 to S23 according to the third embodiment is identical with that in the first embodiment.

In Step S24B, the block management unit 31B within the memory controller 30B reads the worn block management table 53B from the RAM 50B, and retrieves the worn block entry No. 53a in which the valid flag 53b is "0: unavailable as the worn block". Then, the block management unit 31B registers the block number in which the error is generated in the physical block No. 53c of the appropriate worn block entry No. 53a, and changes the valid flag 53b to "1: available as the worn block". Also, the block management unit 31B stores the number of errors notified from the error correction circuit 32 in the number of generated errors 53d of the appropriate worn block entry No. 53a.

Processing of Step S25 in the third embodiment is identical with that in the first embodiment.

In Step S26B, the block management unit 31B implements the free block replenishment processing. The free block replenishment processing will be described in detail with reference to FIG. 16 to be described later.

The data movement processing to the free block in the storage device 103 of the third embodiment is executed by a flowchart of FIG. 9 as in the first embodiment.

Figure 16:
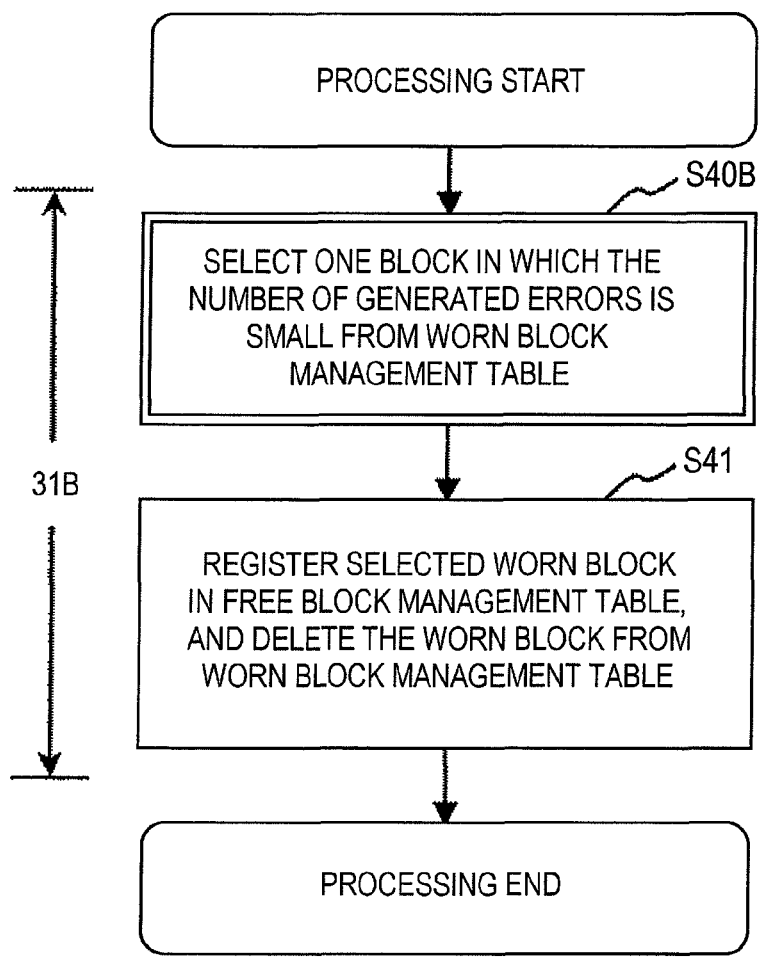
FIG. 16 is a flowchart of free block replenishment processing according to the third embodiment.

FIG. 16 is a flowchart of the free block replenishment processing according to the third embodiment. Accordingly, the flowchart of the block replacement processing in FIG. 10 according to the first embodiment is replaced with that in FIG. 16.

In Step S40B, the block management unit 313 reads the worn block management table 53B from the RAM 50B, selects one of the worn block entry Nos. 53a in which the valid flag 53b is "1: available as the worn block", and acquires the physical block No. 53c. In this example, in selecting the worn block entry No. 53a, the block management unit 31B preferentially selects the worn block entry No. 53a in which the number of generated errors 53d is smaller. If a plurality of the worn block entry Nos. 53a having the same number of generated errors 53d is present, the block management unit 31B selects the worn block entry No. 53a whose registration is older.

Processing of Step S41 in the third embodiment is identical with that in the first embodiment.

In the third embodiment described above, in short, when the worn block is used as the free block in the first embodiment, the worn block in which the number of generated errors is smaller is preferentially used with the following advantages.

In selecting the worn block 62 to be moved from the worn block management table 53B to the free block management table 52, the block management unit 31B within the memory controller 30B in the storage device 10B preferentially selects the worn block 62 in which the number of generated errors 53d is smaller. As a result, the worn block 62 in which the number of errors is smaller can be used as the free block 61, and the reliability of the storage device 10B can be improved.

Fourth Embodiment

This embodiment exemplifies the storage device that can further prolong the operating time, and also improve the reliability. In this embodiment, the number of error counts is a new management item.

Figure 17:
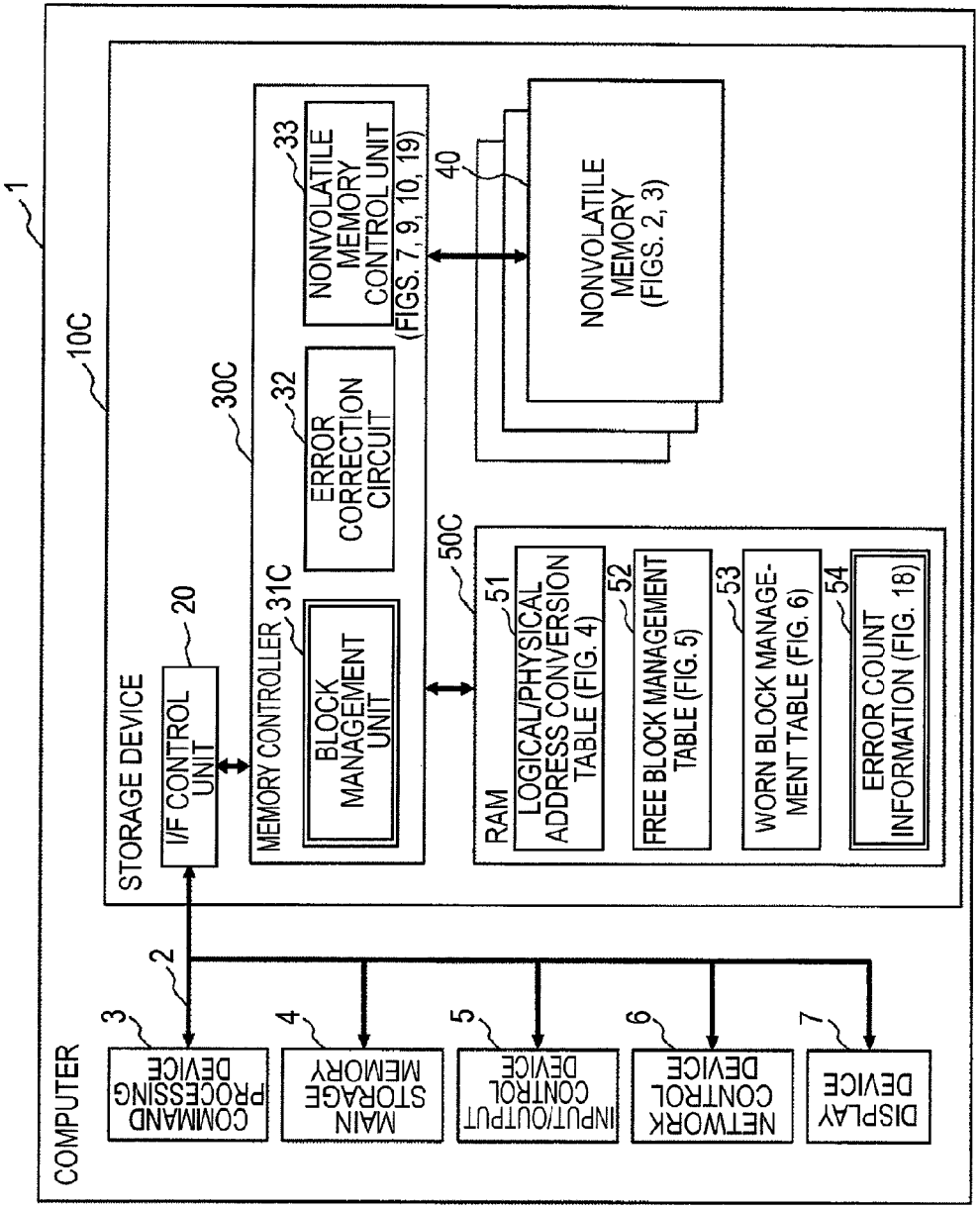
FIG. 17 is a diagram illustrating a hardware configuration according to a fourth embodiment.

FIG. 17 illustrates an example of a hardware configuration diagram according to a fourth embodiment. The same elements as those in the hardware configuration diagram of the first embodiment are denoted by identical reference numerals or symbols.

A storage device 10C in the tough embodiment has a memory controller 30C different from the memory controller 30 of the storage device 10 in the first embodiment. Also, the storage device 10C of the fourth embodiment has a RAM 50C different from the RAM 50 of the storage device 10 in the first embodiment. The other configurations of the storage device 10C in the fourth embodiment are identical with those of the storage device 10 in the first embodiment.

The memory controller 30C in the fourth embodiment has a block management unit 31C different from the block management unit 31 in the memory controller 30 in the first embodiment. The other configurations of the memory controller 30C in the fourth embodiment are identical with those of the memory controller 30 in the first embodiment.

The RAM 50C in the fourth embodiment has an error count information 54 in addition to the RAM 50 of the first embodiment. The error count information 54 will be described in detail with reference to FIG. 18 to be described later.

Figure 18:
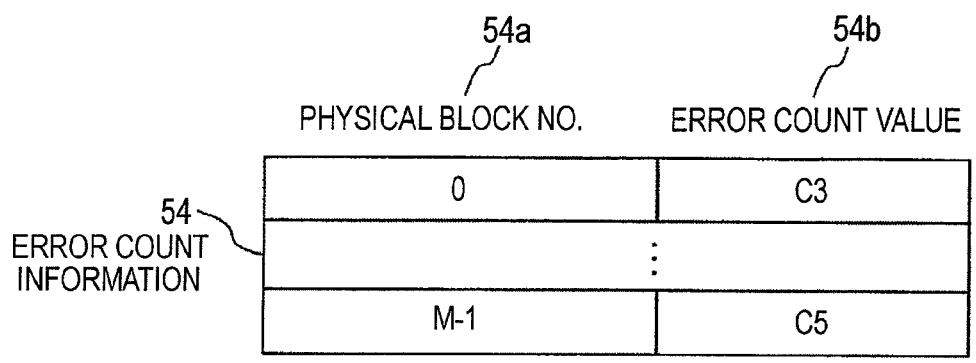
FIG. 18 is a diagram illustrating the contents of error count information according to the fourth embodiment.

FIG. 18 is a configuration diagram of the error count information 54 according to the fourth embodiment. The error count information 54 stores an error count value 54b corresponding to a physical block No. 54a therein. The error count value 54b is added when the error is generated in the data read operation.

The data read operation of the storage device 10C in the fourth embodiment is identical with that of the storage device 10 in the first embodiment.

Figure 19:
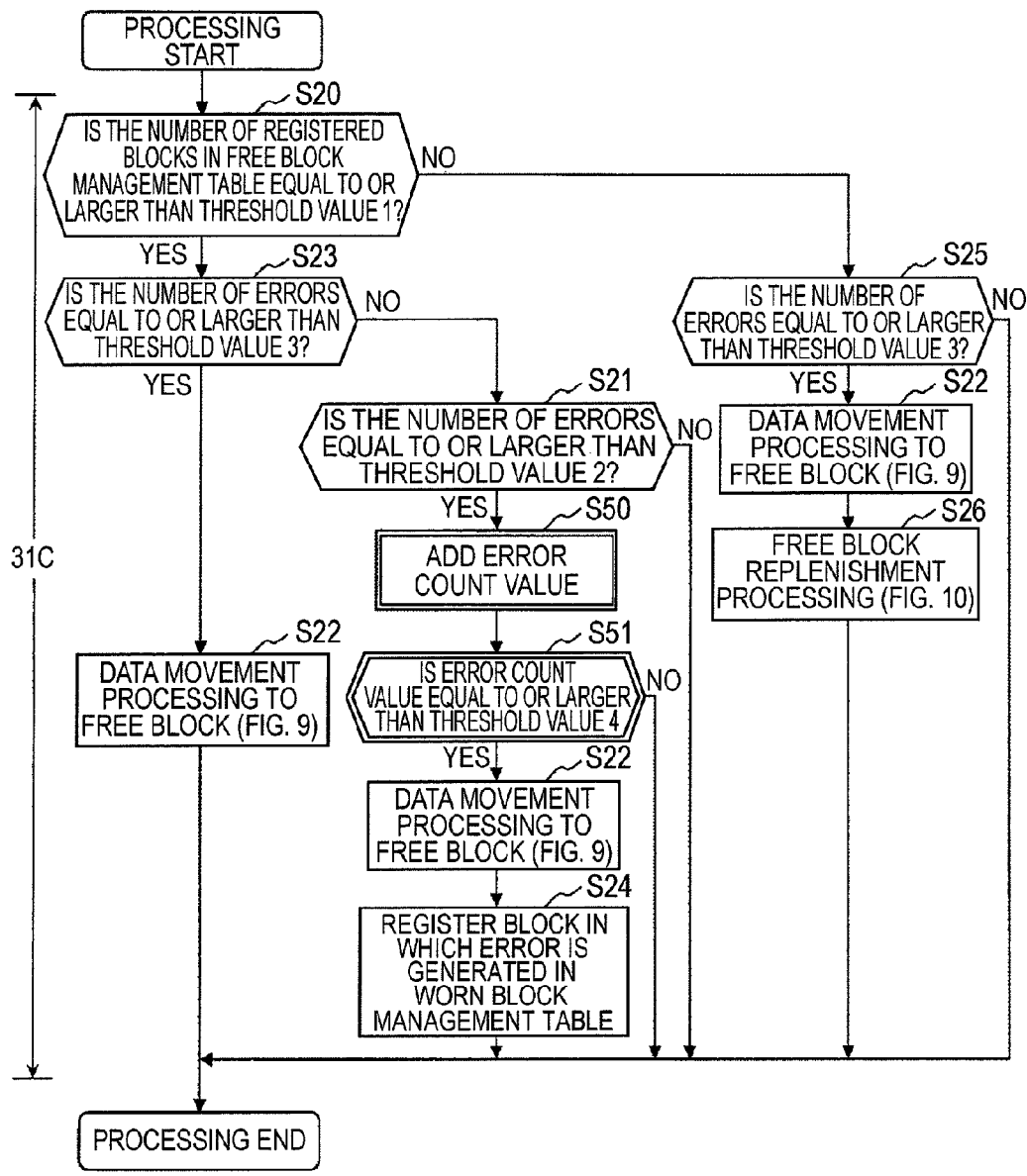
FIG. 19 is a flowchart of block replacement processing according to the fourth embodiment.

FIG. 19 is a flowchart of the block replacement processing according to the fourth embodiment. Accordingly, the flowchart of the block replacement processing in FIG. 10 according to the first embodiment, or the flowchart of the block replacement processing in FIG. 15 according to the third embodiment is replaced with that of FIG. 16, and processed. The same elements as those in the flowchart of the block replacement processing in the first embodiment are denoted by identical reference numerals or symbols.

Referring to FIG. 19, processing in Steps S20 to S26 is identical with that in the first embodiment. When FIG. 19 is compared with FIG. 8 of the first embodiment, the determination order of determination Steps S21 and S23 is different from each other. In short, FIG. 19 is different from FIG. 8 only in that Steps S50 and S51 are added as processing when the number of errors is equal to or larger than the threshold value 2 but smaller than the threshold value 3.

In the Step S50 as processing when the number of errors is equal to or larger than the threshold value 2 but smaller than the threshold value 3, the block management unit 31C within the memory controller 30C reads the error count information 54 from the RAM 50C, and increments the error count value 54b of the physical block No. 54a that matches the block in which the errors are generated, by one.

In Step S51, the block management unit 31C determines whether the error count value 54b added in Step S50 is equal to or larger than a threshold value 4, or not. If the error count value 54b is equal to or larger than the threshold value 4, the flow proceeds to the processing of Step S22, and if the error count value 54b is smaller than the threshold value 4, the block management unit 31C terminates the block replacement processing.

The data movement processing to the free block in the storage device 10C according to the fourth embodiment is identical with that of the storage device 10 in the first embodiment.

In the fourth embodiment described above, in short, if the number of free blocks is equal to or larger than the threshold value 1, and the errors of the number equal to or larger than the threshold value 2 but smaller than the threshold value 3 are included in the read data in the first embodiment, the number of errors in that data is counted, and if the error count value becomes equal to or larger than the threshold value 4, the block is used as the worn block 62, with the following advantages.

The block management unit 31C within the memory controller 30C in the storage device 10C increments the error count value 54b of the appropriate block if the errors of the number equal to or larger than the threshold value 2 but smaller than the threshold value 3 are generated in the data read operation. Then, the block management unit 31C registers the blocks in which the error count value 54b is equal to or larger than the threshold value 4 in the worn block management table 53. As a result, the data block 60 in which only sudden errors are generated is continuously used, and the data block 60 in which chronic errors are generated becomes the worn block 62. For that reason, the determination precision is improved more than a case in which the determination is conducted by the number of generated errors once, and both of the operating time and reliability of the storage device 10C can be improved.

Fifth Embodiment

This exemplifies the storage device that can further prolong the operating time, and also improve the reliability.

Figure 20:
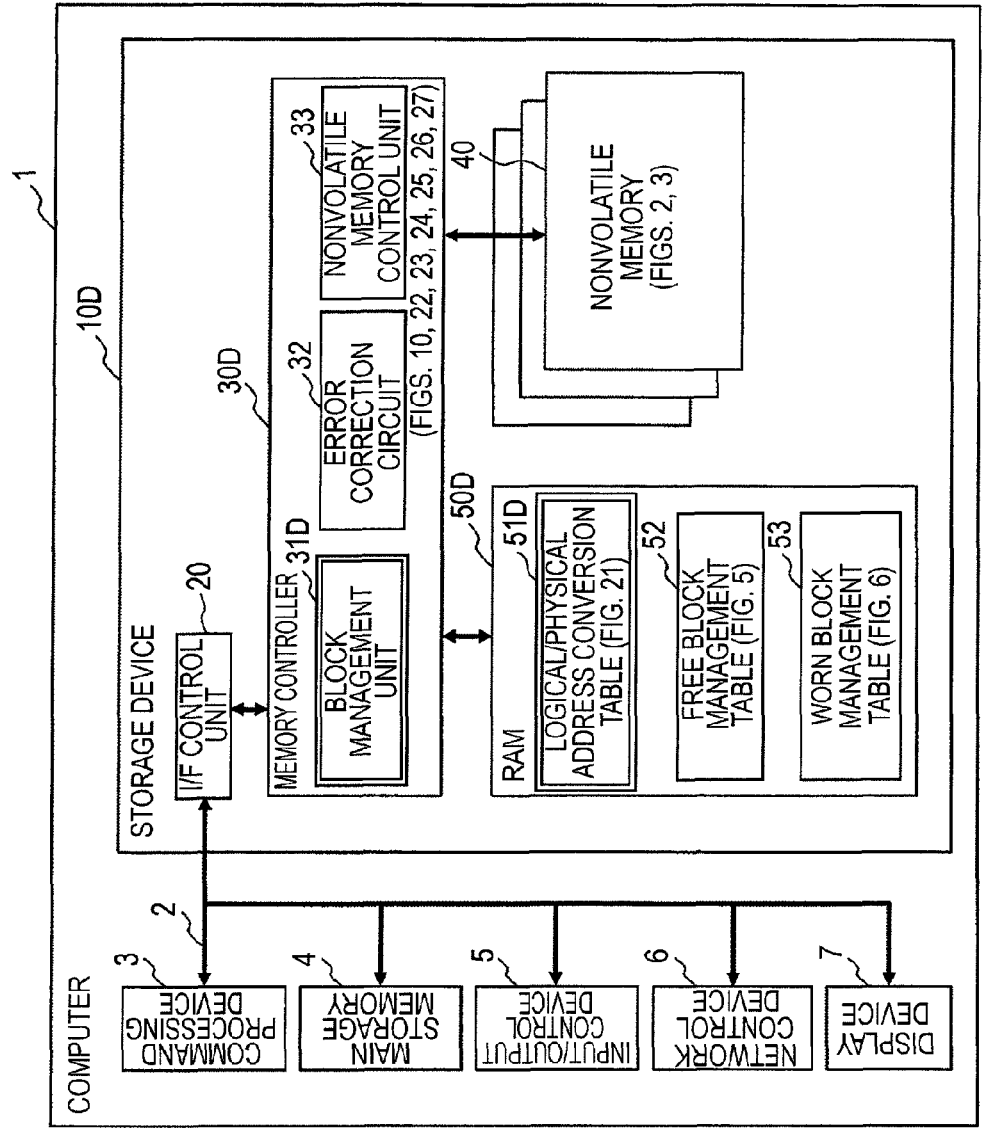
FIG. 20 is a diagram illustrating a hardware configuration according to a fifth embodiment.

FIG. 20 illustrates an example of a hardware configuration diagram according to a fifth embodiment. The same elements as those in the hardware configuration diagram of the first embodiment are denoted by identical reference numerals or symbols.

A storage device 10D in the fifth embodiment has a memory controller 30D different from the memory controller 30 of the storage device 10 in the first embodiment. Also, the storage device 10D of the fifth embodiment has a RAM 50D different from the RAM 50 of the storage device 10 in the first embodiment. The other configurations of the storage device 10D in the fifth embodiment are identical with those of the storage device 10 in the first embodiment.

The memory controller 30D in the fifth embodiment has a block management unit 31D different from the block management unit 31 in the memory controller 30 in the first embodiment. The other configurations of the memory controller 30D in the fifth embodiment are identical with those of the memory controller 30 in the first embodiment.

The RAM 50D in the fifth embodiment has a logical/physical address conversion table 51D different from the logical/physical address conversion table 51 in the RAM 50 of the first embodiment. The other configurations of the RAM 50D in the fifth embodiment are identical with those in the RAM 50 of the first embodiment.

Figure 21:
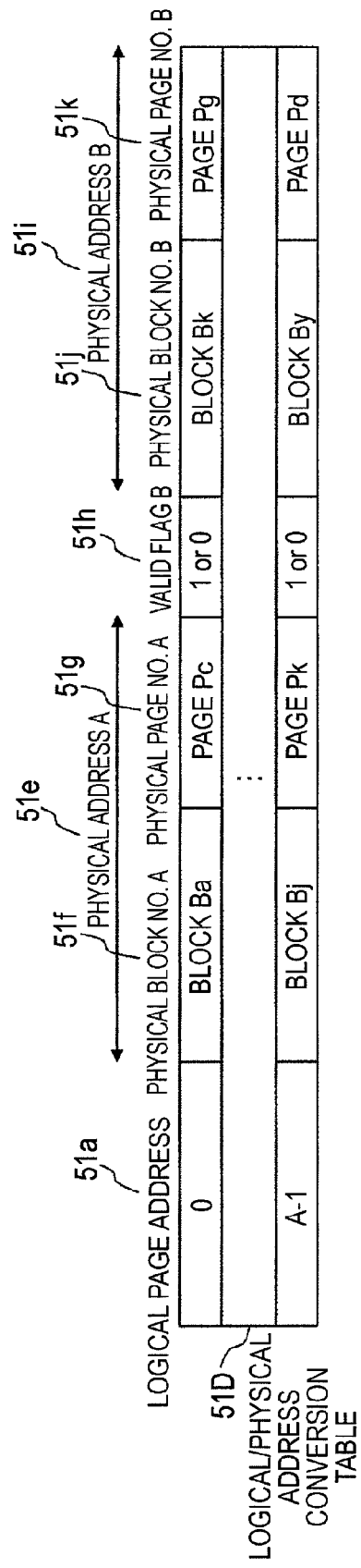
FIG. 21 is a diagram illustrating the contents of a logical/physical address conversion table according to the fifth embodiment.

FIG. 21 is a configuration diagram of the logical/physical address conversion table 51D according to the fifth embodiment. The logical/physical address conversion table 51D in the fifth embodiment includes two physical addresses and a valid flag. A physical address A (51e) is provided instead of the physical address 51b in the logical/physical address conversion table 51 of the first embodiment, and a physical address B (51i) is also provided.

A valid flag B (51h) represents whether the physical address B (51i) corresponding to the logical page address 51a is valid, or not, and becomes "1" if the physical address B (51i) is valid, and "0" if the physical address B (51i) is invalid.

The physical address B (51i) is a physical address of the nonvolatile memory 40 corresponding to the logical page address 51a, and stores a physical address different from the physical address A (51e) therein. Also, the physical address B (51i) is configured by the combination of a physical block No. B (51j) and a physical page No. B (51k).

Figure 22:
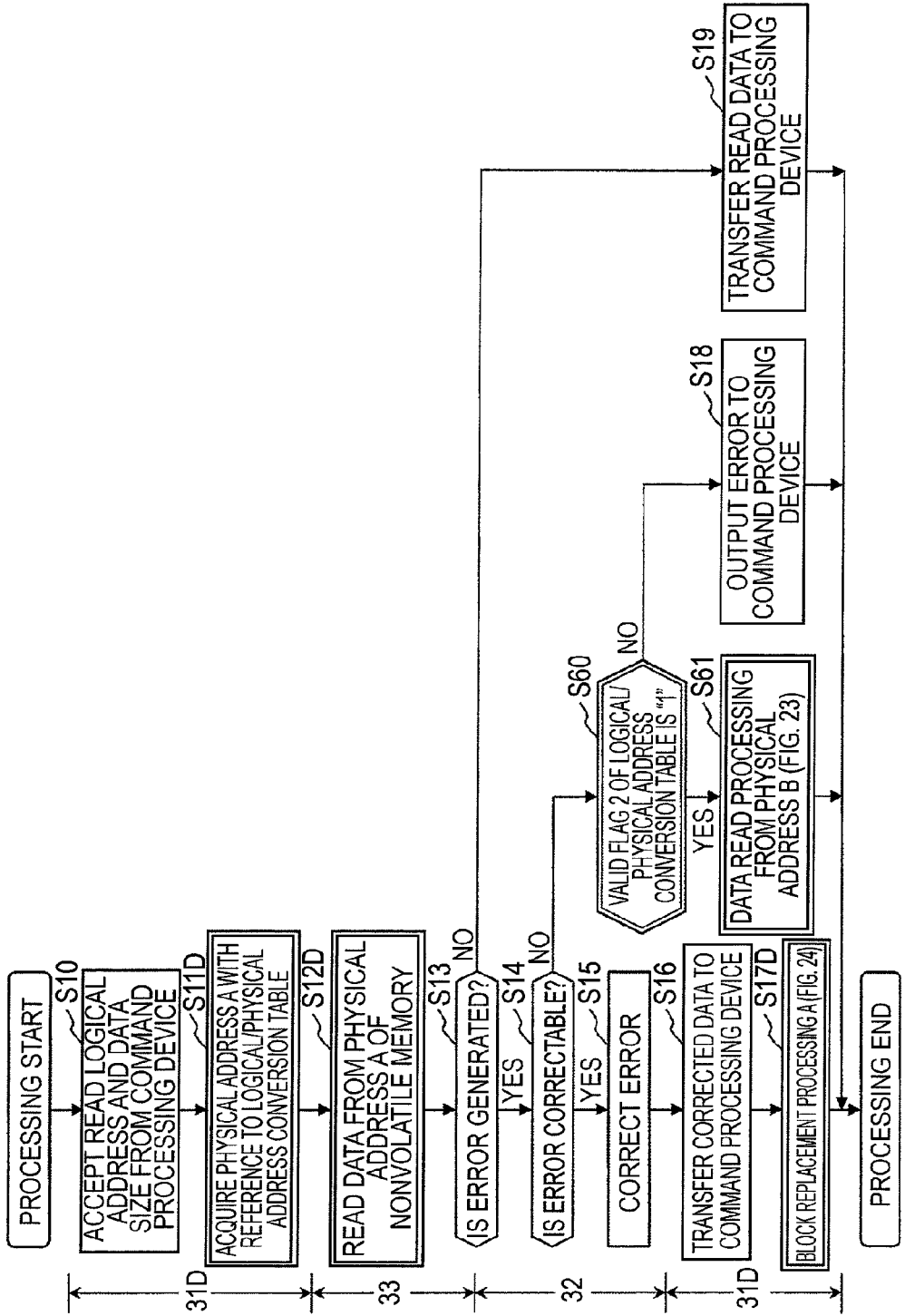
FIG. 22 is a flowchart of data read processing according to the fifth embodiment.

FIG. 22 is a flowchart of the data read processing according to the fifth embodiment. Accordingly, the flowchart of the data read processing in FIG. 7 according to the first embodiment is replaced with that of FIG. 22, and processed. The same elements as those in the flowchart of the data read processing in the first embodiment are denoted by identical reference numerals or symbols.

In step S10, Steps S13 to S16, Step S18 and S19, the same processing as that in the first embodiment is conducted. Hereinafter, a flow of the processing in FIG. 22 will be described in order.

First, in Step S10, the block management unit 31D within the memory controller 30 receives the logical address and the data size of a read target from the command processing device 3 through the I/F control unit 20.

In Step S11D, the block management unit 31D within the memory controller 30D converts the logical address received from the command processing device 3 in Step S10 into the logical page address 51a. Thereafter, the block management unit 31D reads the physical address A (51e) corresponding to the logical page address 51a with the use of the logical/physical address conversion table 51D.

In Step S12D, the block management unit 31D instructs the nonvolatile memory control unit 33 to read data from the physical address A (51e) read in Step S11D. The nonvolatile memory control unit 33 reads the data from the nonvolatile memory 40 according to an instruction from the block management unit 31D.

In Step S13, the nonvolatile memory control unit 33 transfers the data read from the nonvolatile memory 40 in Step S12D to the error correction circuit 32. The error correction circuit 32 determines whether the error is included in the data received from the nonvolatile memory control unit 33, or not.

In this situation, if the error is included in the data, the flow proceeds to processing of Step S14. If no error is included in the data, after the error correction circuit 32 has transferred the data to the block management unit 31D, the flow proceeds to processing of Step S19.

In Step S14, the error correction circuit 32 determines whether the error included in the data is correctable, or not. If correctable, the flow proceeds to processing of Step S15, and if not correctable, the flow proceeds to processing of Step S60.

In Step S15, the error correction circuit 32 corrects the error within the data. In this situation, the error correction circuit 32 transfers the corrected data to the block management unit 31D, and also notifies the block management unit 31D of the number of corrected errors.

In Step S16, the block management unit 31D transfers the corrected data to the command processing device 3 through the I/F control unit 20.

In Step S17D, the block management unit 31D implements the block replacement processing A. The block replacement processing A will be described in detail with reference to FIG. 24 to be described later.

In the other hand, in Step S14, in the processing of Step S60 where the data is uncorrectable, the block management unit 31D determines whether the valid flag B (51h) corresponding to the logical page address 51a of the logical/physical address conversion table 51D is "1: the physical address B is valid", or not. If the valid flag B (51h) is "1: the physical address B is valid", processing of Step S61 is conducted, and if the valid flag B (51h) is "0: the physical address B is invalid", processing of Step S18 is conducted.

In Step S18, the error correction circuit 32 notifies the block management unit 31D that the error correction is impossible. Upon receiving a notification from the error correction circuit 32, the block management unit 31D notifies the command processing device 3 of a data read error through the I/F control unit 20.

In Step S61, the block management unit 31D implements data read from the physical address B. The data read from the physical address B will be described in detail with reference to FIG. 23 to be described later.

Figure 23:
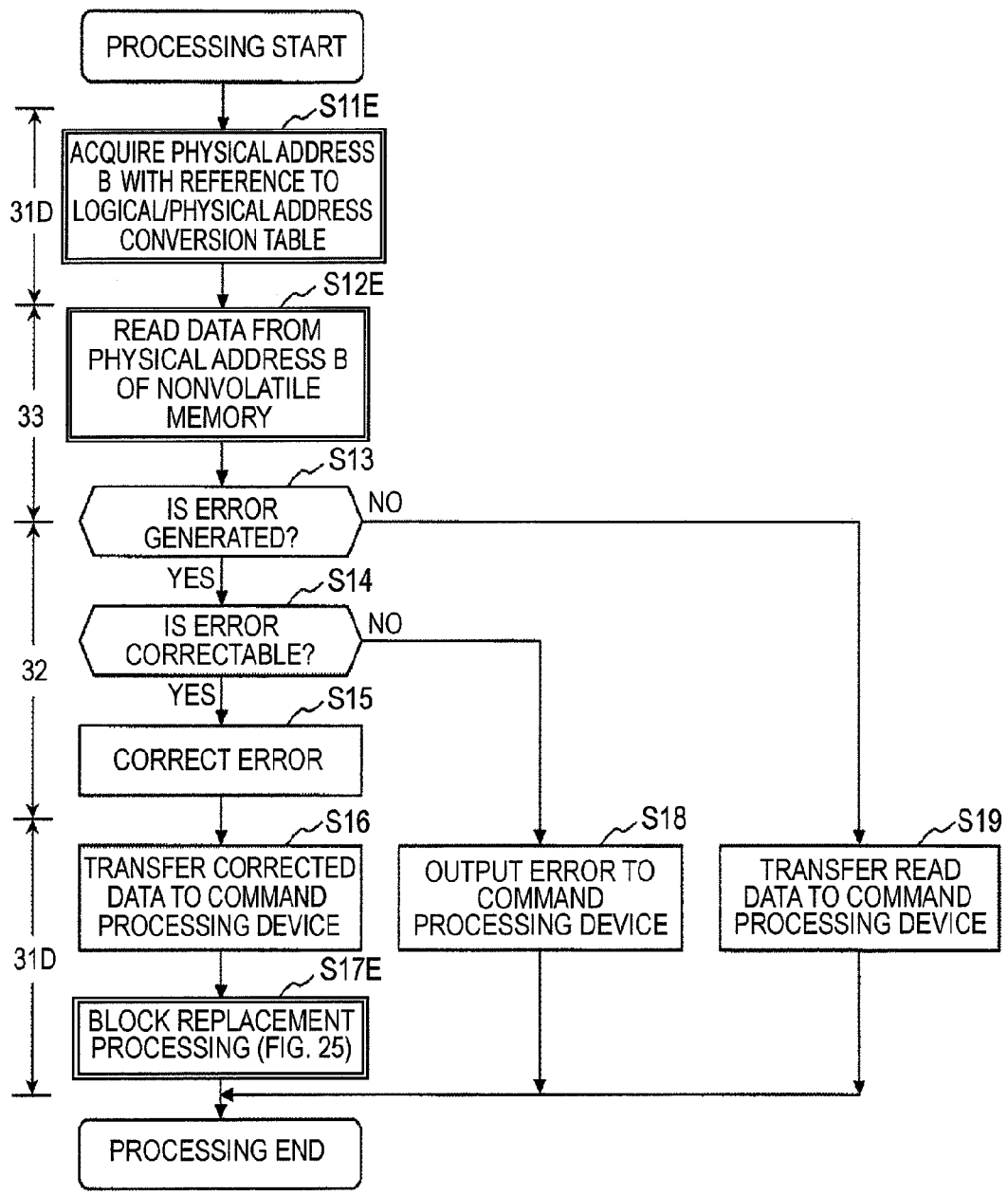
FIG. 23 is a flowchart of data read processing from a physical address B according to the fifth embodiment.

FIG. 23 is a flowchart of the data read processing from the physical address B according to the fifth embodiment. The data read processing from the physical address B in FIG. 23 basically executes the same processing as that in the flowchart of the data read processing in FIG. 7. The same elements as those in the data read processing of the first embodiment are denoted by identical reference numerals or symbols.

In Step S11E which is first processing in FIG. 23, the block management unit 31D within the memory controller 30D reads the physical address B (51i) corresponding to the logical page address 51a with the use of the logical/physical address conversion table 51D.

In Step S12E, the block management unit 31D instructs the nonvolatile memory control unit 33 to read the data from the physical address B (51i) read in Step S11E. The nonvolatile memory control unit 33 reads the data from the nonvolatile memory 40 according to an instruction from the block management unit 31D.

In Steps S13 to S16, Steps S18, and S19, the same processing as that in the first embodiment is conducted. An essential difference of the flowchart of the data read processing in FIG. 23 from that in FIG. 7 resides in that the block replacement processing B is applied.

In Step S17E, the block management unit 31D implements the block replacement processing B. The block replacement processing B will be described in detail with reference to FIG. 25 to be described later. Thus, in the fifth embodiment, two block replacement processing is implemented. First, the block replacement processing A in FIG. 24 will be described, and thereafter the block replacement processing B in FIG. 25 will be described.

Figure 24:
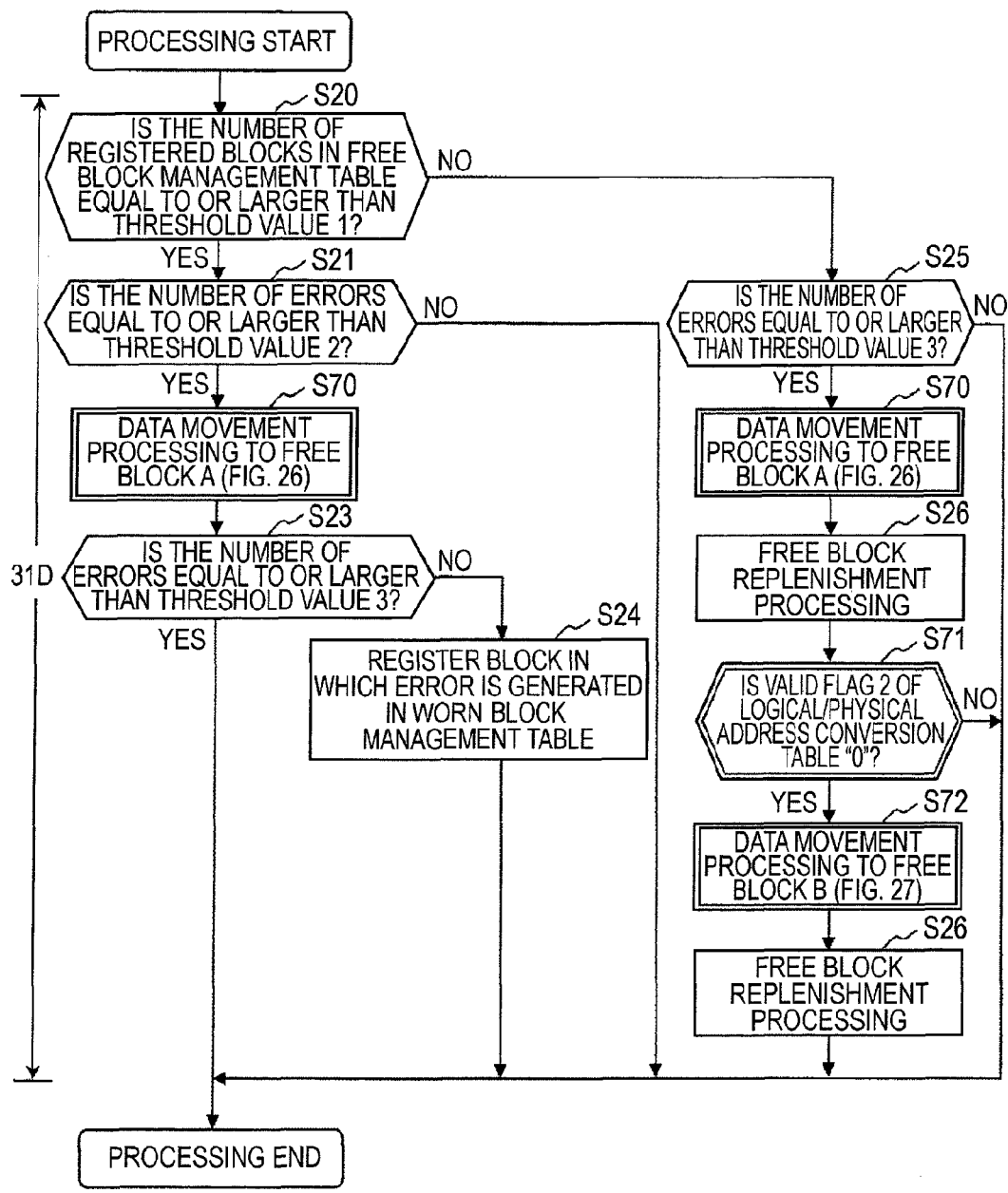
FIG. 24 is a flowchart of block replacement processing A according to the fifth embodiment.

FIG. 24 illustrates a flowchart of the block replacement processing A in Step S17D according to the fifth embodiment. The same elements as those in the flowchart of the block replacement processing of FIG. 8 in the first embodiment are indicated by identical reference numerals or symbols.

Processing in Steps S20 to S26 is identical with that in the first embodiment.

First, in Step S20, the block management unit 31D determines whether the number of free blocks registered in the free block management table 52 is equal to or larger than the threshold value 1, or not. If the number of free blocks is equal to or larger than the threshold value 1, the flow proceeds to processing of Step S21, and if the number of free blocks is smaller than the threshold value 1, the flow proceeds to processing of Step S25.

As illustrated in FIG. 5, the number of free blocks 61 registered in the free block entry No. 52a of the free block management table 52 is C at a maximum. In this example, the number of available (data "1") free blocks is extracted with reference to the information on the valid flag 52b, and compared with the threshold value 1.

In Step S21, the block management unit 31D determines whether the number of errors notified from the error correction circuit 32 is equal to or larger than the threshold value 2, or not. If the number of errors is equal to or larger than the threshold value 2, the flow proceeds to processing of Step S70, and if the number of errors is smaller than the threshold value 2, the block management unit 31D terminates the block replacement processing A.

In Step S70, the block management unit 31D implements the data movement processing to the free block A. The data movement processing to the free block A will be described in detail with reference to FIG. 26 to be described later.

In Step S23 after the data movement to the free block, the block management unit 31D determines whether the number of errors notified from the error correction circuit 32 is equal to or larger than the threshold value 3, or not. If the number of errors is equal to or larger than the threshold value 3, the block management unit 31D terminates the block replacement processing A, and if the number of errors is smaller than the threshold value 3, the flow proceeds to processing of Step S24. The threshold value 3 is larger than the threshold value 2.

In Step S24, the block management unit 31D reads the worn block management table 53 (FIG. 6) from the RAM 50, and retrieves the worn block entry No. 53a in which the valid flag 53b is "0: unavailable as the worn flag". Then, the block management unit 31D registers the block No. in which the error is generated in the physical block No. 53c of the appropriate worn block entry No. 53a, and changes the valid flag 53b to "1: available as the worn flag". After completion of the processing in Step S24, the block management unit 31D terminate the block replacement processing A.

On the other hand, in Step S25, the block management unit 31D determines whether the number of errors notified from the error correction circuit 32 is equal to or larger than the threshold value 3, or not. If the number of errors is equal to or larger than the threshold value 3, the flow proceeds to processing (data movement processing to the free block A) of Step S70, and if the number of errors is smaller than the threshold value 3, the block management unit 31D terminates the block replacement processing.

The data movement processing to the free block A in Step S70 executes the same processing as that described above, and its description will be omitted.

In subsequent Step S71, the block management unit 31D determines whether the valid flag B (51h) corresponding to the logical page address 51a of the logical/physical address conversion table 51D is "0: physical address B is invalid", or not. If the valid flag B (51h) is "0: physical address B is invalid", the flow proceeds to processing of Step S72, and if the valid flag B (51h) is "1: physical address B is valid", the block management unit 31D terminates the block replacement processing A.

In Step S72, the block management unit 31D implements the data movement processing to the free block B. The data movement processing to the free block B will be described in detail with reference to FIG. 27 to be described later.

In Step S26, the block management unit 31D implements the free block replenishment processing. The free block replenishment processing is described in detail with reference to FIG. 10, and its description will be omitted. After the completion of the processing in Step S26, the block management unit 31D terminates the block replacement processing A.

Figure 25:
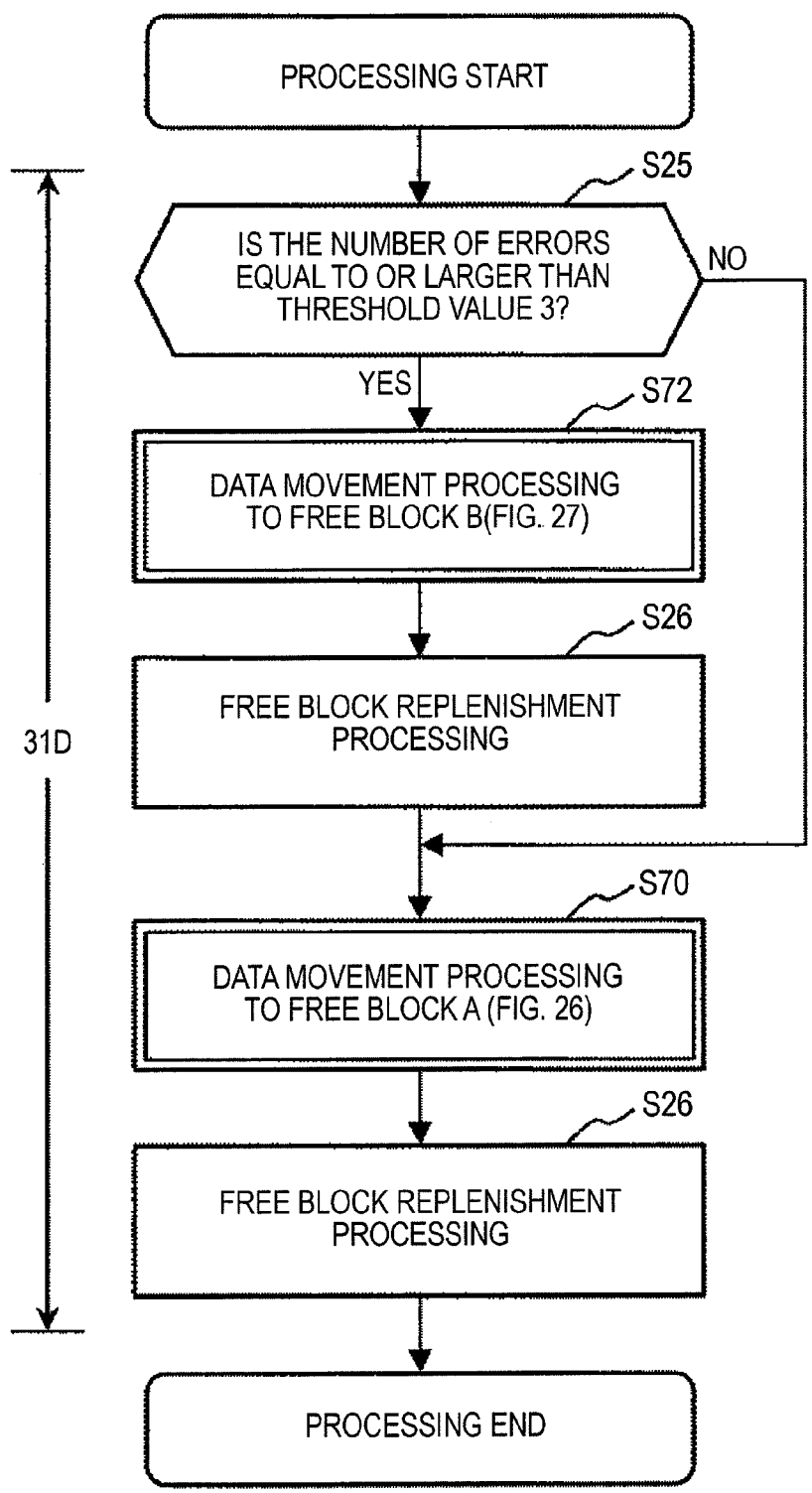
FIG. 25 is a flowchart of block replacement processing B according to the fifth embodiment.

FIG. 25 is a flowchart of the block replacement processing B according to the fifth embodiment. The same elements as those in the block replacement processing A are denoted by identical reference numerals or symbols.

In Step S25, the block management unit 31D determines whether the number of errors notified from the error correction circuit 32 is equal to or larger than the threshold value 3, or not. If the number of errors is equal to or larger than the threshold value 3, the flow proceeds to processing of Step S72, and if the number of errors is smaller than the threshold value 3, the flow proceeds to processing of Step S70.

The processing of Step S70 and Step S72 is identical with the block replacement processing A in the fifth embodiment. In short, if the number of errors is equal to or larger than the threshold value 3, the data movement processing to the free block B, the data movement processing to the free block A, and the replenishment of the free block are implemented. If the number of errors is smaller than the threshold value 3, the data movement processing to the free block A and the replenishment of the free block are implemented if the number of errors is smaller than the threshold value 3.

In the processing of Step S26, the block management unit 31D implements the free block replenishment processing. The free block replenishment processing is described in detail with reference to FIG. 10.

Figure 26:
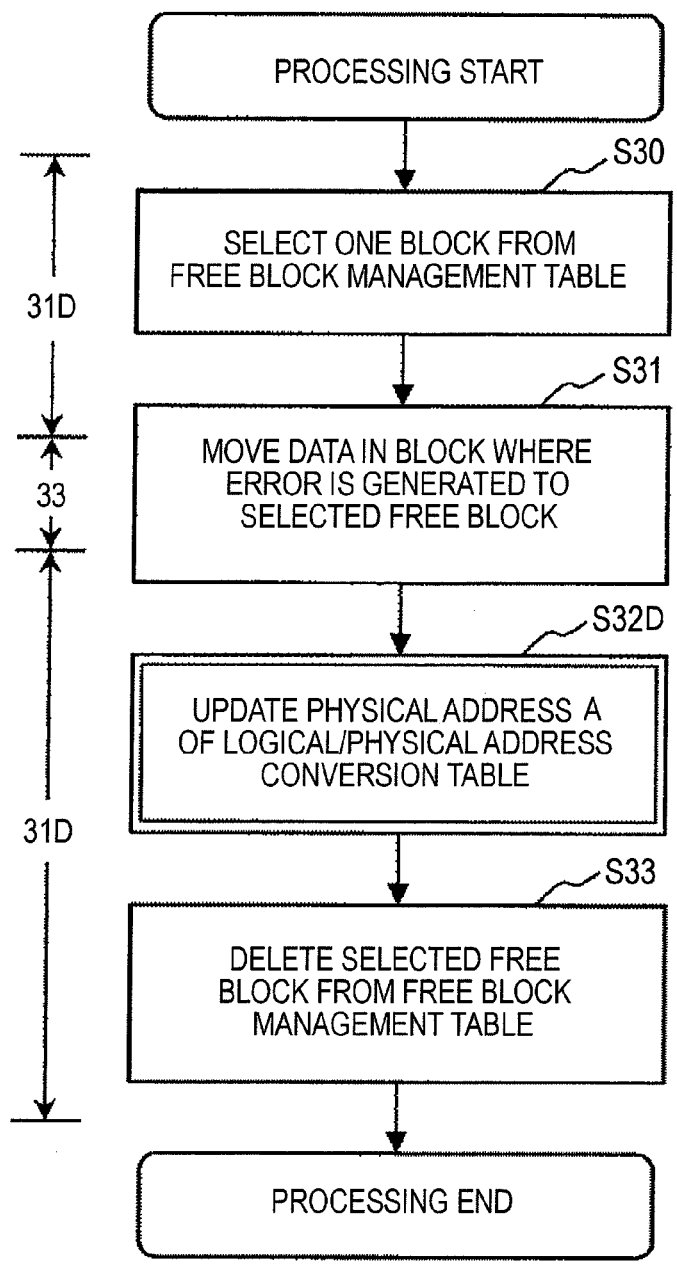
FIG. 26 is a flowchart of data movement processing to a free block A according to the fifth embodiment.

FIG. 26 is a flowchart of the data movement processing to the free block A according to the fifth embodiment. The same elements as those in the data movement processing to the free block in FIG. 9 of the first embodiment are denoted by identical reference numerals or symbols.

First, in Step S30, the block management unit 31D reads the free block management table 52 (FIG. 5) from the RAM 50, selects one of the free block entry Nos. 52a in which the valid flag 52b is "1: available as the free block", and acquires the physical block No. 52c. In this example, a system of selecting the free block entry No. 52a is not particularly restricted, but the free block entry Nos. 52a may be selected in order from older entry of the registration such as an FIFO (first in first out).

In Step S31, the block management unit 31D instructs the nonvolatile memory control unit 33 to copy the data retained by the data block 60 in which the errors are generated to the physical block No. 52c selected in Step S30. The nonvolatile memory control unit 33 implements the data copy to the selected block according to an instruction from the block management unit 31D. Also, after the completion of the data copy, the block management unit 31D instructs the nonvolatile memory control unit 33 to erase the data of the data block 60 in which the errors are generated. The nonvolatile memory control unit 33 erases the data within the appropriate block according to the instruction from the block management unit 31D.

Subsequently, in Step S32D, the block management unit 31D updates the physical address A (51e) corresponding to the logical page address 51a of the copied data to No. of the free block 61 which is a copy target, in the logical/physical address conversion table 51D.

Finally, in Step S33, the block management unit 31D changes the valid flag 52b of the free block entry No. 52a selected in Step S30 to "0: unavailable as the free block" in the free block management table 52 (FIG. 5).

Figure 27:
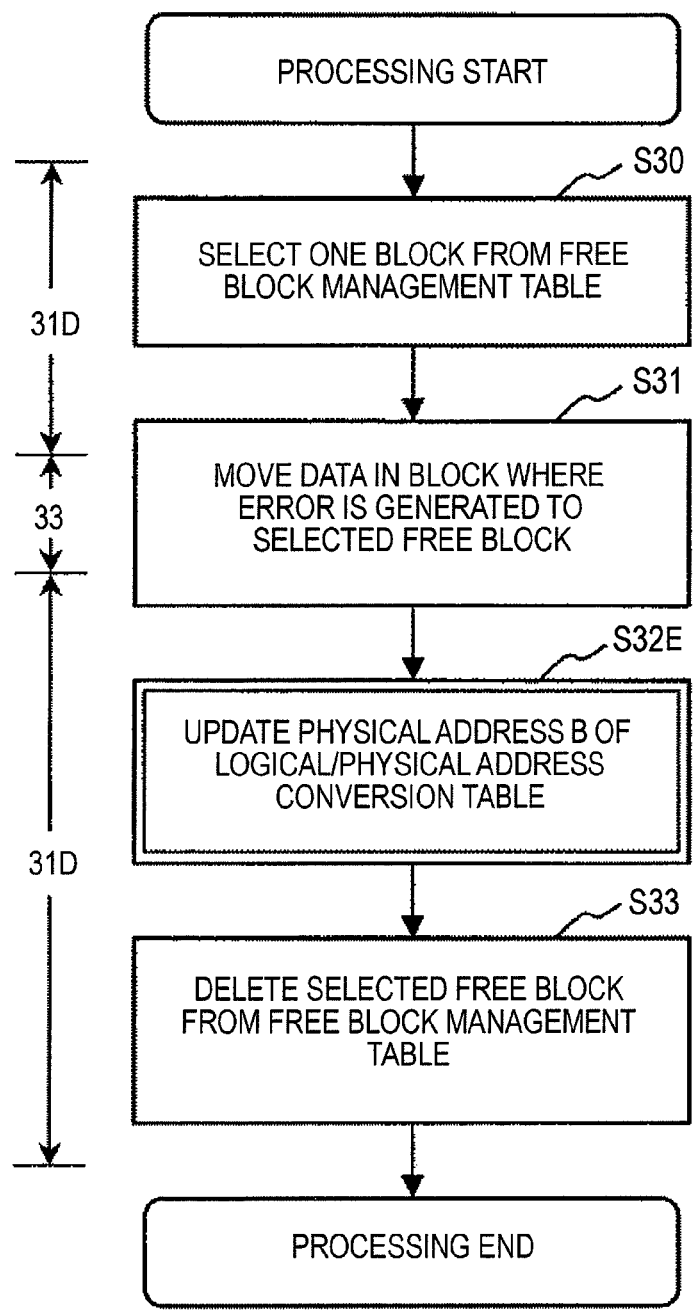
FIG. 27 is a flowchart of data movement processing to a free block B according to the fifth embodiment.

FIG. 27 is a flowchart of the data movement processing to the free block B according to the fifth embodiment. The same elements as those in the data movement processing to the free block in the first embodiment are denoted by identical reference numerals or symbols.

In the figure, the processing in Steps S30 to S31, and Step S33 is identical with that in FIG. 25, and therefore only Step S32E will be described.

In Step S32E, the block management unit 31D updates the physical address B (51i) corresponding to the logical-page address 51a of the copied data to No. of the free block 61 which is a copy target in the logical/physical address conversion table 51D. Also, the block management unit 31D changes the valid flag B (51h) corresponding to the logical page address 51a to "1: physical address B is valid".

The fifth embodiment described above has the following advantages.

If the number of free blocks within the free block management table 52 is smaller than the threshold value 1, the worn block 62 is replenished as the free block 61. For that reason, the blocks higher in the reliability, which are originally the free blocks 61, and the blocks lower in the reliability, which are originally the worn blocks 62, are mixed together within the free block management table 52.

In the fifth embodiment, in the above state, in moving the data from the data block 60 in which the errors are generated to the free block 61, the same data is saved in the two free blocks 61. The data is thus doubled, as a result of which even if the block low in the reliability is selected as the free block 61 of the data movement destination, a possibility that the moved data is lost can be reduced, and the reliability of the storage device 10D can be improved.

Sixth Embodiment

This embodiment is a modified example of the fifth embodiment.

Figure 28:
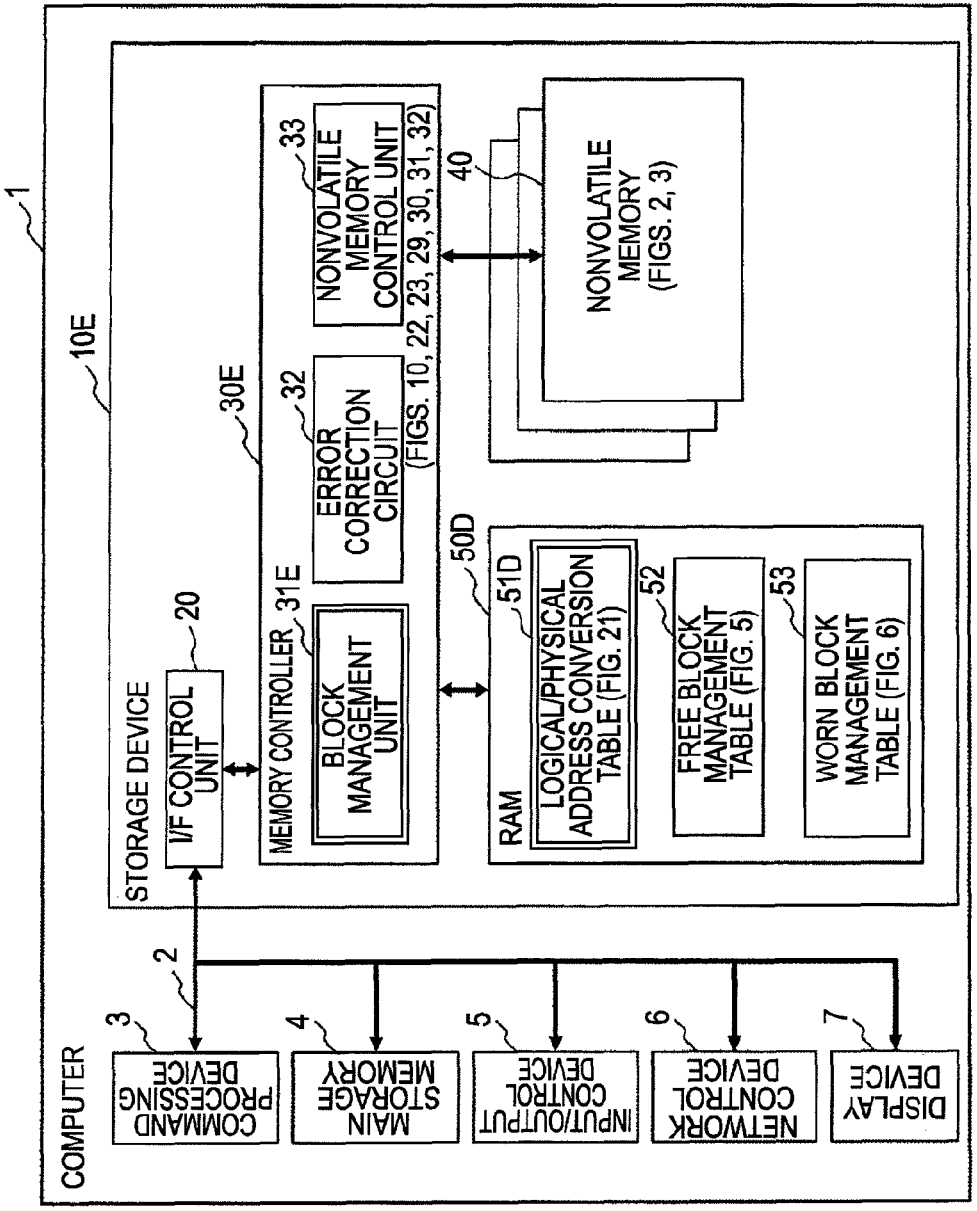
FIG. 28 is a diagram illustrating a hardware configuration according to a sixth embodiment.

FIG. 28 illustrates an, example of a hardware configuration diagram according to a sixth embodiment. The same elements as those in the hardware configuration diagram in the fifth embodiment are denoted by the identical reference numerals or symbols.

The storage device 10E in the sixth embodiment has a memory controller 30E different from the memory controller 30D in the storage device 10D of the fifth embodiment. The other configurations are identical between the storage device 10E of the sixth embodiment and the storage device 10D of the fifth embodiment.

The memory controller 30E in the sixth embodiment has a block management unit 31E different from the block management unit 31D in the memory controller 30D of the fifth embodiment. The other configurations are identical between the memory controller 30E of the sixth embodiment and the memory controller 30D of the fifth embodiment.

The data read operation in the sixth embodiment is identical with that in the fifth embodiment.

The data read operation from the physical address B in the sixth embodiment is identical with that in the fifth embodiment.

Figure 29:
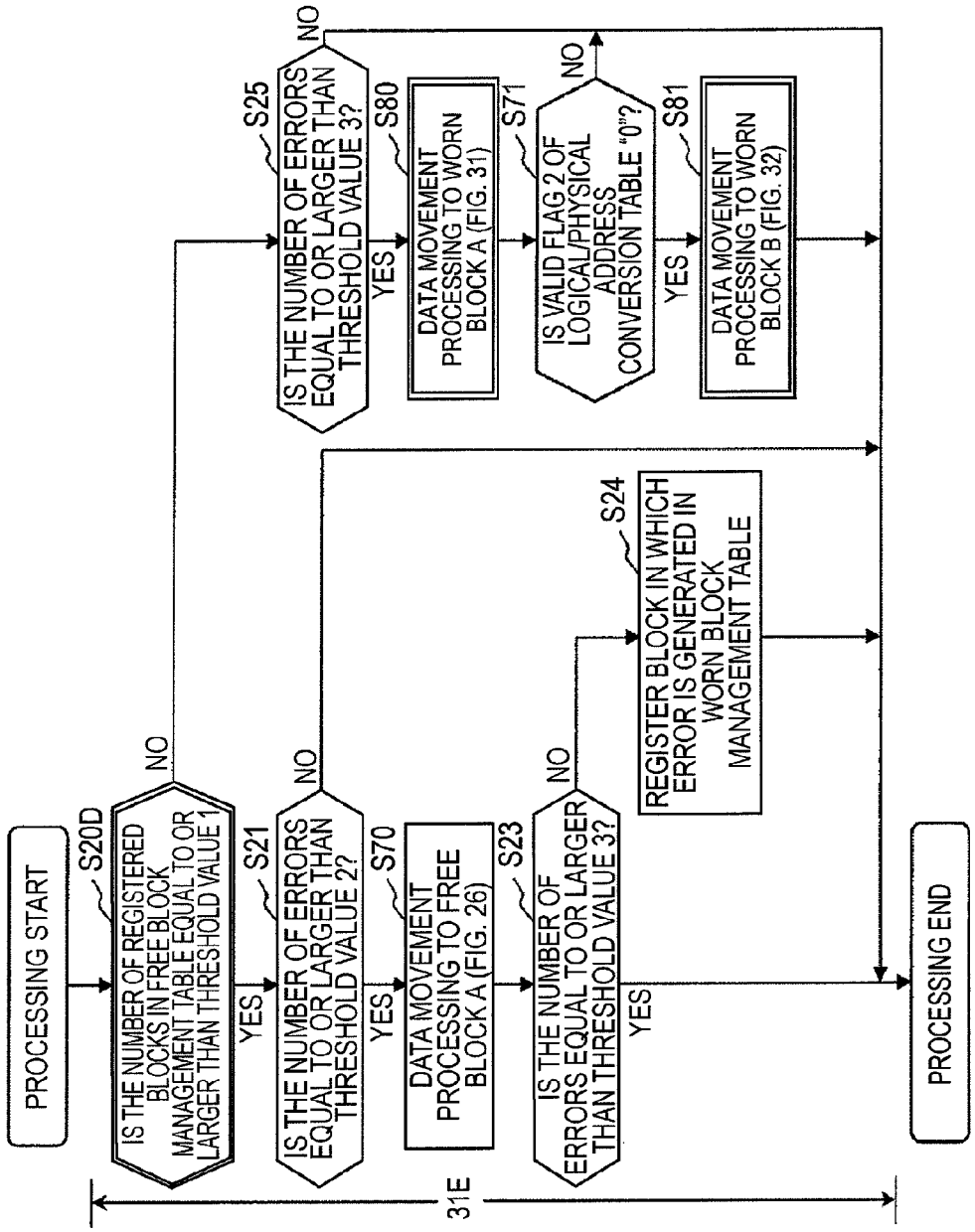
FIG. 29 is a flowchart of block replacement processing A according to the sixth embodiment.

FIG. 29 illustrates a flowchart of the block replacement processing A according to the sixth embodiment. The same elements as those in the flowchart of the block replacement processing A in the fifth embodiment are denoted by the identical reference numerals or symbols.

In Step S20D, the block management unit 31E determines whether one or more free blocks 61 are registered in the free block management table 52, or not. If one or more free blocks 61 are registered, the block management unit 31E conducts processing of Step S21, and if no free block 61 is registered, the flow proceeds to processing of Step S25.

The processing of Step S21, Steps S23 to S25, Steps S70 and S71 is identical with that in the fifth embodiment.

In Step S21, the block management unit 31E determines whether the number of errors notified from the error correction circuit 32 is equal to or larger than the threshold value 2, or not. If the number of errors is equal to or larger than the threshold value 2, the flow proceeds to processing of Step S70, and if the number of errors is smaller than the threshold value 2, the block management unit 31E terminates the block replacement processing A.

In Step S70, the block management unit 31E implements the data movement processing to the free block A. The data movement processing to the free block A is described in FIG. 26.

In Step S23 after the data movement to the free block, the block management unit 31E determines whether the number of errors notified from the error correction circuit 32 is equal to or larger than the threshold value 3, or not. If the number of errors is equal to or larger than the threshold value 3, the block management unit 31E terminates the block replacement processing A, and if the number of errors is smaller than the threshold value 3, the flow proceeds to processing of Step S24. The threshold value 3 is larger than the threshold value 2.

In Step S24, the block management unit 31E reads the worn block management table 53 (FIG. 6) from the RAM 50, and retrieves the worn block entry No. 53a in which the valid flag 53b is "0: unavailable as the worn block". Then, the block management unit 31E registers the block No. in which the errors are generated in the physical block No. 53c of the appropriate worn block entry No. 53a, and changes the valid flag 53b to "1: available as the worn block". After the completion of the processing in Step S24, the block management unit 31E terminals the block replacement processing A.

On the other hand, in Step S25, the block management unit 31E determines whether the number of errors notified from the error correction circuit 32 is equal to or larger than the threshold value 3, or not. If the number of errors is equal to or larger than the threshold value 3, the flow proceeds to processing of Step S80 (data movement processing to the free block), and if number of errors is smaller than the threshold value 3, the block management unit 31E terminates the block replacement processing A.

In Step S80, the block management unit 31E implements the data movement processing to the worn block A. The data movement processing to the worn block A will be described in detail with reference to FIG. 31 to be described later.

In subsequent Step S71, the block management unit 31E determines whether the valid flag B (51h) corresponding to the logical page address 51a of the logical/physical address conversion table 51D is "0: physical address B is invalid", or not. If the valid flag B (51h) is "0: physical address B is invalid", the flow proceeds to processing in Step S81, and if the valid flag B (51h) is "1: physical address B is valid" the block management unit 31E terminates the block replacement processing A.

In Step S81, the block management unit 31E implements the data movement processing to the worn block B. The data movement processing to the worn block B will be described in detail with reference to FIG. 32 to be described later. After the completion of the processing in Step S81, the block management unit 31E terminates the block replacement processing A.

Figure 30:
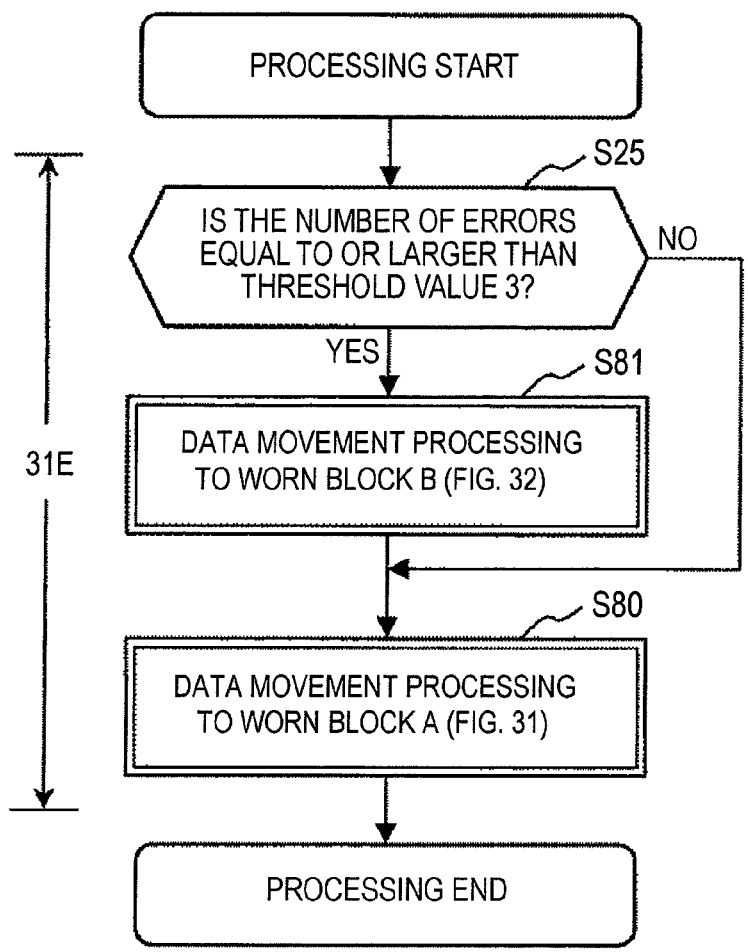
FIG. 30 is a flowchart of block replacement processing B according to the sixth embodiment.

FIG. 30 is a flowchart of the block replacement processing B according to the sixth embodiment. The same elements as those in the block replacement processing A of the sixth embodiment are denoted by identical reference numerals or symbols.

First, in Step S25, the block management unit 31E determines whether the number of errors notified from the error correction circuit 32 is equal to or larger than the threshold value 3, or not. If the number of errors is equal to or larger than the threshold value 3, the flow proceeds to processing in Step S81, and if the number of errors is smaller than the threshold value 3, the flow proceeds to processing in Step S80. In short, if the number of errors is equal to or larger than the threshold value 3, the data moves to the worn block B and the worn block A, and if the number of errors is smaller than the threshold value 3, the data moves to only the worn block A.

Processing of Steps S80 and S81 is identical with that in the block replacement processing A in the sixth embodiment.

Figure 31:
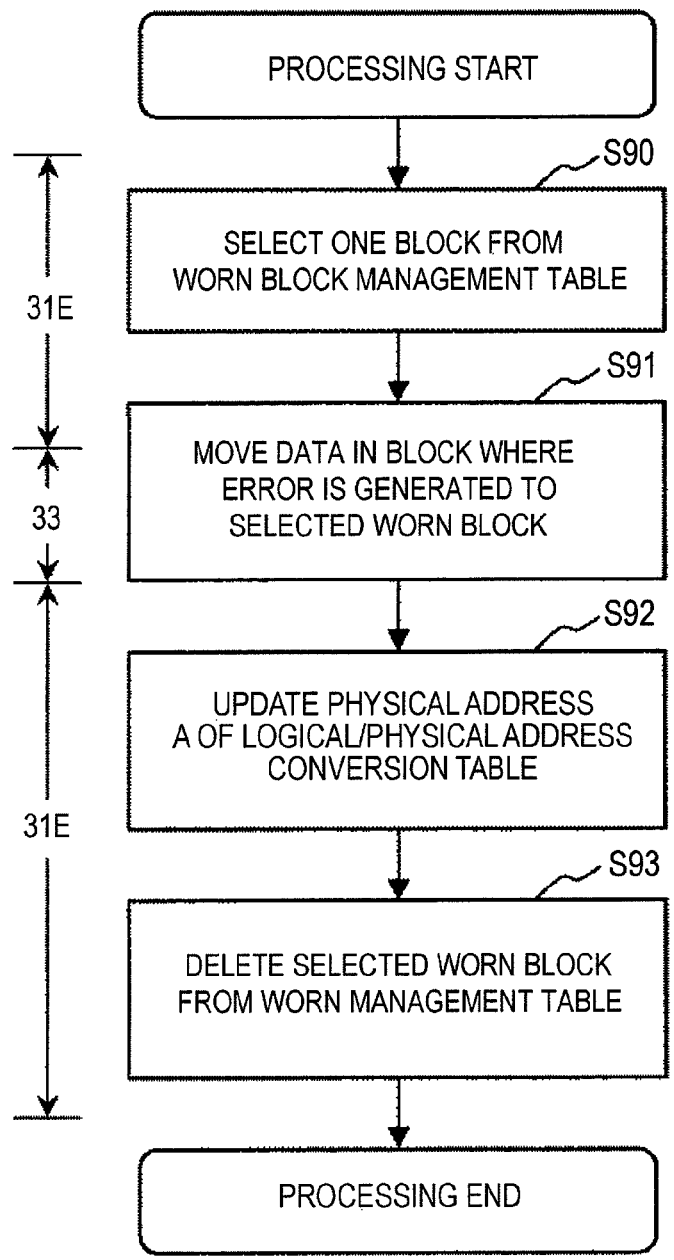
FIG. 31 is a flowchart of data movement processing to a worn block A according to the sixth embodiment.

FIG. 31 is a flowchart of the data movement processing to the worn block A according to the sixth embodiment.

In Step S90, the block management unit 31E reads the worn block management table 53 from the RAM 50D, and selects one of the worn block entry Nos. 53a in which the valid flag 53b is "1: physical address B is valid", and acquires the physical block No. 53c.

In Step S91, the block management unit 31E instructs the nonvolatile memory control unit 33 to copy the data retained in the data block 60 in which the errors are generated to the physical block No. 53c selected in Step S90. The nonvolatile memory control unit 33 implements the data copy to the selected block according to an instruction from the block management unit 31E. Also, after the completion of the data copy, the block management unit 31E instructs the nonvolatile memory control unit 33 to erase the data of the data block 60 in which the errors are generated. The nonvolatile memory control unit 33 erases the data within the appropriate block according to the instruction from the block management unit 31E.

In Step S92, the block management unit 31E updates the physical address A (51e) corresponding to the logical page address 51a of the copied data to No. of the worn block 62 which is a copy target, in the logical/physical address conversion table 51D.

In Step S93, the block management unit 31E changes the valid flag 53b of the worn block entry No. 53a selected in Step S80 to "0: physical address B is invalid", in the worn block management table 53. After the completion of the processing in Step S93, the block management unit 31E completes the data movement processing to the worn block A.

FIG. 32 is a flowchart of the data movement processing to the worn block B according to the sixth embodiment. The same elements as those in the flowchart of the data movement processing to the worn block A in the sixth embodiment are denoted by identical reference numerals or symbols.

Processing in Steps S90, S91, and S93 is identical with the data movement processing to the worn block A in the sixth embodiment.

In Step S94, the block management unit 31E updates the physical address B (51i) corresponding to the logical page address 51a of the copied data to No. of the worn block 62 which is a copy target, in the logical/physical address conversion table 51D. Also, the block management unit 31E changes the valid flag B (51h) corresponding to the logical page address 51a to "1: physical address B is valid".

The sixth embodiment described above has the following advantages.

When a value of the threshold value 1 used for block management is set to 1, the block management unit 31E does not use the worn block 62 until the free block 61 is eliminated. The worn block 62 is a block in which the errors of the number equal to or larger than the threshold value 2 are generated, and therefore the reliability is lower than that of the free block 61. The free block 61 is used prior to the worn block 62 lower in the reliability with the result that the reliability of the storage device 10E can be enhanced.

The present invention is not limited to the above embodiments, but includes a variety of modified examples. For example, in the above-mentioned embodiments, in order to easily understand the present invention, the specific configurations are described. However, the present invention does not always provide all of the configurations described above. Also, a part of the configuration of one embodiment can be replaced with the configuration of another embodiment, and the configuration of one embodiment can be added with the configuration of another embodiment. Also, in a part of the configuration of each embodiment, another configuration can be added, deleted, or replaced.

Also, parts or all of the above-described configurations, functions, processors, processing means may be realized, for example, as an integrated circuit, or other hardware. Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

What is claimed is:
1. A memory management method in which a memory includes a plurality of blocks which is an erasure unit, and the plurality of blocks in the memory is divided into a plurality of data blocks, a plurality of free blocks, and a worn block in use,
conducting data check when reading data from the memory, continuously using the data block that retains the data as the data block if the number of errors in the read data is smaller than a threshold value 2, and discarding the data block that retains the data if the number of errors in the read data is equal to or larger than a threshold value 3, and
treating the data block that retains the data as the worn block if the number of free blocks is equal to or larger than a threshold value 1, and the errors equal to or larger than the threshold value 2 and smaller than the threshold value 3 are included in the read data, and using the worn block as the free block if the number of free blocks is lower than the threshold value 1, and the errors equal to or larger than the threshold value 3 are included in the read data.

2. The memory management method according to claim 1, wherein the worn block in which the number of generated errors is smaller is preferentially used when the worn block is used as the free block.

3. The memory management method according to claim 1, wherein if the number of free blocks is equal to or larger than the threshold value 1, and the errors of the number equal to or larger than the threshold value 2 but smaller than the threshold value 3 are included in the read error, the number of errors in the data is counted, and if an error count value becomes equal to or larger than a threshold value 4, the block is used as the worn block.

4. The memory management method according to claim 1, wherein if the number of free blocks is equal to or larger than the threshold value 1, and the errors of the number equal to or larger than the threshold value 2 but smaller than the threshold value 3 are included in the read error, the data within the data block in which the errors are generated is moved to the free block, and the data block is treated as the worn block, and
wherein if the number of free blocks is smaller than the threshold value 1, and the errors of the number equal to or larger than the threshold value 3 are included in the read data, the data within the data block in which the errors are generated is moved to the worn block, and the worn block is used as the free block.

5. A storage device including a nonvolatile memory having a page which is a given write unit, and a block which is an erasure unit larger than the write unit; a RAM which allows data to be read and written therefrom or therein; and a memory controller that conducts read and write processing on the nonvolatile memory and the RAM,
wherein the RAM includes a free block management table that manages the free block, and a worn block management table that manages the worn block, and
wherein when the number of free blocks registered in the free block management table is equal to or larger than a threshold value 1, and errors of the number equal to or larger than a threshold value 2 and smaller than a threshold value 3 are included in data read from the nonvolatile memory, the memory controller registers the data block that holds the data in the worn block management table as the worn block, and when the number of free blocks registered in the free block management table is smaller than the threshold value 1, the memory controller registers the worn block registered in the worn block management table in the free block management table as the free block.

6. The storage device according to claim 5, wherein the data block that retains the data is continuously used as the data block if the number of errors in the read data is smaller than the threshold value 2, and the data block that retains the data is discarded if the number of errors in the read data is equal to or larger than the threshold value 3.

7. The storage device according to claim 5, wherein the memory controller has a threshold value setting register, and
wherein values of the threshold value 1, the threshold value 2, and the threshold value 3 are changed by a value of the threshold value setting register.

8. The storage device according to claim 5, wherein the worn block management table has the number of generated errors, and
wherein the memory controller preferentially registers the worn block smaller in the number of generated errors when registering the worn block registered in the worn block management table in the free block management table as the free block.

9. The storage device according to claim 5, wherein if the number of free blocks registered in the free block management table is smaller than the threshold value 1, and the errors of the number equal to or larger than the threshold value 3 are included in the data read from the nonvolatile memory, the memory controller moves the data within the data block in which the errors are generated to a plurality of free blocks registered in the free block management table.

10. A storage device including a nonvolatile memory having a page which is a given write unit, and a block which is an erasure unit larger than the write unit; a RAM which allows data to be read and written therefrom or therein; and a memory controller that conducts read and write processing on the nonvolatile memory and the RAM,
wherein the RAM includes a free block management table that manages the free block, and a worn block management table that manages the worn block, and
wherein the memory controller increments the error count value of the data block which retains the data by one if the number of free blocks registered in the free block management table is equal to or larger than a threshold value 1, and errors of the number equal to or larger than a threshold value 2 and smaller than a threshold value 3 are included in the data read from the nonvolatile memory, the memory controller registers the data block in the worn block management table as the worn block if the error count value becomes equal to or larger than a threshold value 4, and the memory controller registers the worn block registered in the worn block management table in the free block management table as the free block if the number of free blocks registered in the free block management table is smaller than the threshold value 1.

11. The storage device according to claim 10, wherein the memory controller has a threshold value setting register, and
wherein values of the threshold value 1, the threshold value 2, the threshold value 3, and the threshold value 4 are changed by a value of the threshold value setting register.

12. The storage device according to claim 10, wherein the worn block management table has the number of generated errors, and
wherein the memory controller preferentially registers the worn block smaller in the number of generated errors when registering the worn block registered in the worn block management table in the free block management table as the free block.

13. The storage device according to claim 10,
wherein if the number of free blocks registered in the free block management table is smaller than the threshold value 1, and the errors of the number equal to or larger than the threshold value 3 are included in the data read from the nonvolatile memory, the memory controller moves the data within the data block in which the errors are generated to a plurality of free blocks registered in the free block management table.

14. A storage device including a nonvolatile memory having a page which is a given write unit, and a block which is a data erasure unit larger than the write unit; a RAM which allows data to be read and written therefrom or therein; and a memory controller that conducts read and write processing on the nonvolatile memory and the RAM,
wherein the RAM includes a free block management table that manages the free block, and a worn block management table that manages the worn block, and
wherein the memory controller moves the data within the data block in which the errors are generated to the free block registered in the free block management table, and registers the data block in the worn block management table as the worn block if the free block is registered in the free block management table, and the errors of the number equal to or larger than the threshold value 2 and smaller than the threshold value 3 are included in the data read from the nonvolatile memory, and the memory controller moves the data within the data block in which the errors are generated to the worn block registered in the worn block management table if the free block is not registered in the free block management table, and the errors of the number equal to or larger than the threshold value 3 are included in the data read from the nonvolatile memory.

15. The storage device according to claim 14,
wherein the memory controller has a threshold value setting register, and
wherein values of the threshold value 1, the threshold value 2, and the threshold value 3 are changed by a value of the threshold value setting register.

16. The storage device according to claim 14,
wherein the worn block management table has the number of generated errors, and
wherein the memory controller preferentially selects the worn block smaller in the number of generated errors when moving the data within the data block in which the errors are generated to the worn block registered in the worn block management table.

17. The storage device according to claim 14,
wherein the memory controller moves the data to a plurality of worn blocks when moving the data within the data block to the worn block.

18. A computer having a command processing device and a storage device,
wherein the storage device includes the storage device according to claim 5.

* * * * *